Figure 1:
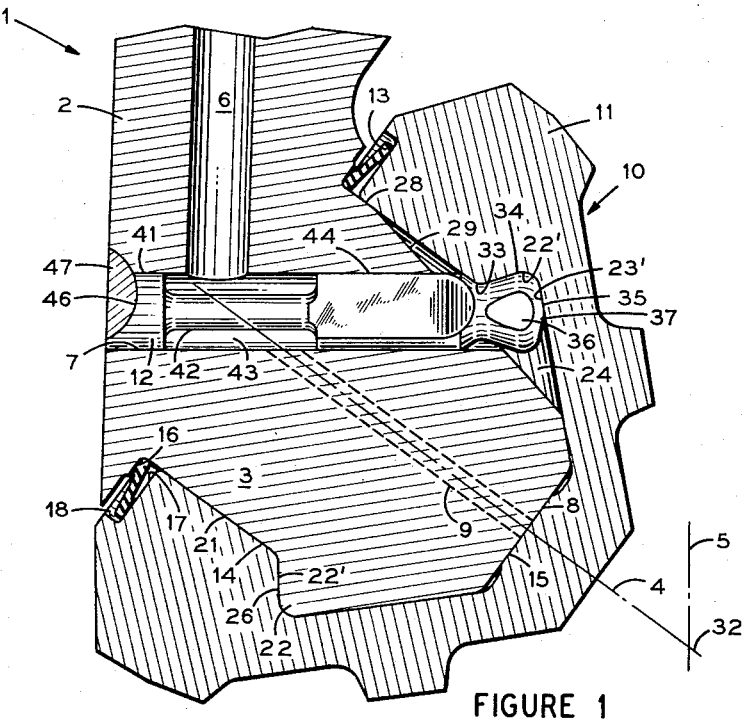

Jan. 2, 1968  E. M. GALLE  3,361,494
JOURNAL BEARING

Filed Aug. 4, 1966  10 Sheets-Sheet 1

EDWARD M. GALLE
INVENTOR.

BY Roy H. Smith, Jr.
ATTORNEY

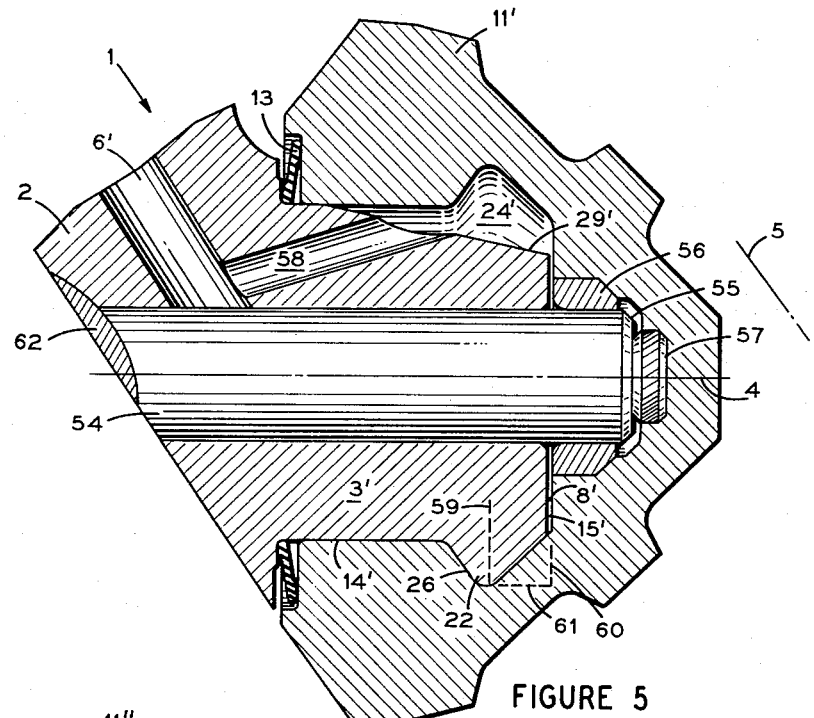
FIGURE 5
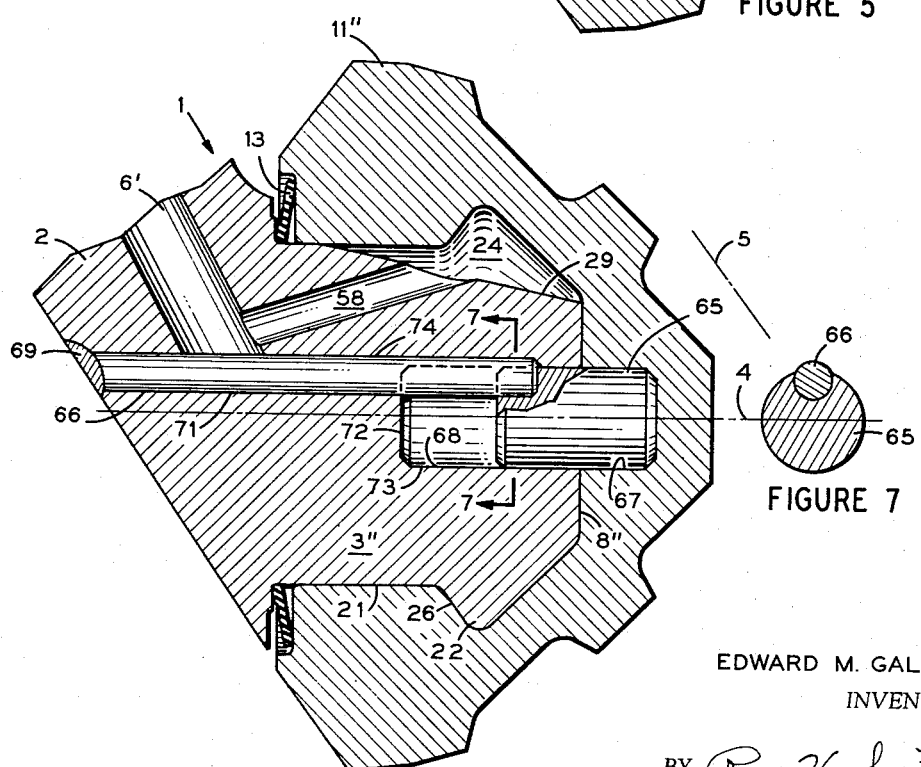
FIGURE 6
FIGURE 7
EDWARD M. GALLE
*INVENTOR.*
BY Roy H. Smith, Jr.
ATTORNEY

EDWARD M. GALLE
INVENTOR.

BY *Roy H. Smith, Jr.*
ATTORNEY

EDWARD M. GALLE
INVENTOR.

BY Roy H. Smith, Jr.
ATTORNEY

Jan. 2, 1968  E. M. GALLE  3,361,494
JOURNAL BEARING
Filed Aug. 4, 1966  10 Sheets-Sheet 5

EDWARD M. GALLE
INVENTOR.

BY Roy H. Smith, Jr.
ATTORNEY

Jan. 2, 1968   E. M. GALLE   3,361,494
JOURNAL BEARING
Filed Aug. 4, 1966   10 Sheets-Sheet 6

EDWARD M. GALLE
INVENTOR.

BY Roy H. Smith, Jr.
ATTORNEY

Jan. 2, 1968　　　　　E. M. GALLE　　　　　3,361,494
JOURNAL BEARING

Filed Aug. 4, 1966　　　　　　　　　　　　　10 Sheets-Sheet 7

EDWARD M. GALLE
*INVENTOR.*

BY *Roy H. Smith, Jr.*
ATTORNEY

EDWARD M. GALLE
INVENTOR.

BY Roy H. Smith, Jr.
ATTORNEY

Jan. 2, 1968  E. M. GALLE  3,361,494
JOURNAL BEARING

Filed Aug. 4, 1966  10 Sheets-Sheet 9

EDWARD M. GALLE
INVENTOR.

BY Roy H. Smith, Jr.
ATTORNEY

Jan. 2, 1968    E. M. GALLE    3,361,494
JOURNAL BEARING

Filed Aug. 4, 1966    10 Sheets-Sheet 10

EDWARD M. GALLE
INVENTOR.

BY Roy H. Smith, Jr.
ATTORNEY

United States Patent Office 3,361,494
Patented Jan. 2, 1968

3,361,494
JOURNAL BEARING
Edward M. Galle, Houston, Tex., assignor to Hughes Tool Company, Houston, Tex., a corporation of Delaware
Filed Aug. 4, 1966, Ser. No. 573,770
30 Claims. (Cl. 308—8.2)

The present invention is a continuation-in-part of copending application S.N. 496,248, filed Oct. 7, 1965, which in turn was filed as a continuation-in-part of then copending application S.N. 200,359, filed June 6, 1962, both now abandoned, and relates to friction journal bearings, in particular friction journal bearings for relatively rotatable members mounted on stub shafts. Such stub shafts or bearing pins are frequently used in mounting the rolling cutters of rotary rock bits, reamers, core drills and other drills used in the rotary method of earth penetration. In such earth penetrating tools, the rolling cutter is mounted on a bearing pin or stub shaft extending in cantilever fashion from a bit leg. The bearing pin extends downwardly and inwardly toward the vertical axis of the bit, and the cutter is designed and mounted to surround the free end and side surfaces of the pin. The assembly must necessarily include some means for locking the cutter on its bearing pin, as an axial displacement or cocking may cause the cutter to become wedged in such a position that it would drag rather than roll as the bit is rotated.

The first rolling cutter rock bits were used in penetrating hard formations. In such early rock bits, journal bearings were used almost exclusively in mounting rotary cutters on the fixed bearing pins extending from the legs of the bit head. Such bearing structures were usually satisfactory for their intended purpose, but they did require a large supply of lubricant. No satisfactory structure for sealing the lubricant into the bearing was developed, so it was necessary to furnish a large supply of lubricant to continuously replace that exuded between bearing pin and cutter. The quantity required had to be sufficient to last throughout the life of the cutting structure, which by contemporary standards was relatively short. When the supply was exhausted or a lubricant passage was blocked, overheating and seizure would result. In addition, such structures permitted contamination of the bearings with drilling mud and fine rock cuttings, even before the lubricant was exhausted. Such abrasive materials were ground between journal and bearing to shorten the life of these surfaces.

When such early bits were used in penetrating softer formations, as subsequently occurred, the inherently longer life of the cutting structure demanded an equally longer life in the bearing structure. The same result obtained with the development of metallurgically improved steel teeth, and also with the more recent development of cutting structure consisting of compacts of tungsten carbide inserted in a metal cutter with the blunt ends of the compacts protruding and serving as the cutting means, as shown in the U.S. patent to Morlan, Scott and Woods, 2,687,875. The latter type bit, introduced to the trade by the Hughes Tool Company under its product mark "Hugheset," revolutionized hard rock drilling by vastly increasing the cutting structure life of hard formation bits.

With both types of bits, it was found advantageous to discard the old journal bearings and substitute antifriction bearings, usually a set of rollers and a set of balls for each cutter, the balls also serving to lock the cutter on its bearing pin. See, for example, the United States patent to Scott and Garfield, 2,030,442. For the most part, the lubrication of such antifriction bearings was left to the drilling fluid entering the bearing gaps between bit leg and rolling cutter at the back face of the latter, although when the drilling fluid was air some bits were provided with passages through the bit legs and bearing pins to divert part of the drilling fluid for the cooling and lubrication of the bearings.

Despite the now well established success of antifriction bearings in earth penetrating tools, such bearings have disadvantages not shared by journal bearing structures. The rotating rollers and balls subject the races in which they operate to a continual stress reversal which in time brings about fatigue failures. No lubricant has as yet been developed to prevent such fatigue failure, even in a well lubricated and contaminant-free bearing. A second disadvantage is that the roller race and ball race can only be provided at the expense of the bearing pin and the rolling cutter. The consequent reductions in bearing pin diameter and cutter shell thickness make for a weaker bearing pin, and a cutter shell with less supporting metal for the teeth or compacts.

The present invention involves the use of journal bearings in lubricated structures sealed against the inflow of drilling fluid, drilling tools lubricated only by the inflow of drilling fluid between bit leg and rolling cutter as mentioned above, and drilling tools lubricated by diverting some of the drilling fluid through the bearing pin, although the preferred environment is one in which a lubricant such as a petroleum grease or the like is supplied together with a means of sealing against the flow of drilling fluid into the bearing gaps and the outflow of lubricant therefrom, and a compensating means to adjust the pressure inside the lubricant reservoir to the pressure of the fluid outside the bit. A recent development which has made it quite feasible to return to journal bearing structures in rock bits is just such a successful means for pressure-compensated sealing between rotary cutters and bit legs to prevent the uncontrolled escape of lubricant, and to prevent the inflow of contaminants. These structures are disclosed in the United States Patent No. 3,075,781 of Atkinson et al., and the U.S. Patent of Cunningham, 3,137,508. More recently developed sealing means which are particularly effective with the present invention are disclosed in the co-pending applications of the present inventor, S.N. 506,654 and 509,480, respectively filed on Nov. 8, 1965, and Nov. 24, 1965.

While the bearing surfaces of the present invention may be of any suitable materials, a preferred combination of materials, particularly for rock bits and other earth penetrating tools, is disclosed in the United States patent issued on Feb. 15, 1966, to J. R. Whanger, 3,235,316. Whanger teaches that unusually superior and unexcepted results are obtained by employing alternating bands of two materials, one being a very hard and wear resistant material such as carburized stainless steel and the other being a soft, anti-galling metal such as silver or a metal alloy high in silver, e.g., a binary alloy containing 85 weight percent silver and 15 weight percent manganese. Such a combination of materials may be used to define the bearing surface of either the shaft or the rotating member of the present invention or both of them. It has been used for the rotating member of rock bits in extensive field tests with excellent results.

Although similar to prior art structures in using friction journal bearings rather than anti-friction bearings, the journal bearing structures of the present invention seek to avoid certain disadvantages of such prior art structures, e.g., in the patent to Scott, 1,909,078. Such older structures utilized an internally threaded journal bushing secured inside the cutter by a locking ring, and were mounted on the bearing pin by an engagement of the bushing threads to corresponding threads on the surface of the bearing pin. While such arrangements worked satisfactorily, they involved at least two parts (bushing and locking ring) in addition to the bearing pin and cutter, plus considerable machining to form the threads, groove for locking ring, etc. In addition, the bushing interposed between bearing pin and cutter, and not integral with either, subtracted from the bearing pin diameter, cutter shell thickness, or both. Although threadedly secured to the bearing pin and thus not rotating with the cone, it could not be considered a part of the bearing pin and was an independent source of trouble as well as reducing the strength of the bearing pin. The same disadvantages were inherent in the friction journal bearing assemblies of E. A. Reed as disclosed in his United States patents issued in 1932 and 1933, Nos. 1,852,478; 1,921,700 and 1,921,701. The structures set forth in these patents include a bearing pin, a bushing in at least one part, a cutter and a locking pin. A lug and recess structure located on the bearing pin and bushing at right angles to the locking pin prevented the bushing from rotating. The main surfaces of the bearing pin, the bushing and the cutter were complete conical surfaces having an included angle of ninety degrees, this feature plus the locking pin and lug-and-recess features purportedly making it possible to assemble the parts without the use of threads but being unworkable for any included angle less than ninety degrees.

Another bushing type assembly is disclosed by A. F. Powell in his U.S. Patent 1,854,624. Powell utilized a bearing pin in the form of a complete right cylinder, and was similar to Scott in threading a bushing onto his bearing pin. His cutter was secured to his bushing by an annular locking ring extending radially between the two members about midway between the ends of the bushing; Powell does not disclose how this ring, which appears to be almost totally surrounded by the cutter and bushing, was placed in position between them, but when so placed it made an assembly with bushing and cutter which was threaded on the bearing pin as a unit. The Powell cutter could only be removed from the bearing pin by unscrewing it and the bushing from the bearing pin, and Powell's bit had the same drawbacks as other structures using threaded bushings—a weak bearing pin and a cutter shell of lesser thickness than is possible without a bushing.

A somewhat more recently patented structure (1952), one employing no bushing, is that of R. G. Peter, 2,620,686. Peter also utilized a right cylindrical bearing pin, but the bearing surface inside his cone had an annular groove of larger diameter than a base cylindrical portion and located forwardly therefrom, toward the nose end of the cone. At the outset his bearing pin was longer than the axial dimension of the cone recess and had no lip to mate with the groove of the cone, but Peter discloses that he formed such a lip by heating the bearing pin and, while it was hot and plastic, forcing the cutter on it by an axial compressive movement, thus upsetting the plastic metal into the groove of the cutter. Assuming that this technique actually worked and resulted in an assembly where the cutter was free to rotate on the bearing pin, it did produce a bushingless assembly wherein the space made available by using no bushing could be utilized for a thicker bearing pin, a thicker cutter shell, or both. However, the assembly had the obvious disadvantage that the cutter was more or less permanently secured to the bearing pin. Since the lip formed on the bearing pin was completely annular and extended radially completely into the deepest part of the cutter bearing surface, the cutter could not be removed by an axial movement or any other type of movement, the only apparent method of separation being to cut the members apart with a torch or saw. No such assembly or anything similar to it is contemplated by the present invention, which utilizes a cutter assembled to a bearing pin with the aid of a locking plug which is removed when desired to permit the cutter to be disassembled from the bearing pin without damage to either.

Since the only necessary function served by prior art structures using a bushing between bearing pin and rolling cutter was to secure the latter two members together, the primary object of the present invention is to provide a rolling cutter mounting structure in which the cutter is journalled directly to the bearing pin, the space utilized by prior art bushings or antifriction bearings being utilized to increase the bearing pin diameter, cutter shell thickness, or both.

As it is believed to be apparent that a rolling cutter can not be locked on a fixed shaft and directly journalled thereto without the intervention of at least one additional member to prevent separation of cutter from shaft by relative axial movement, cocking, or some combination thereof, it is another object to furnish such a directly journalled combination of rolling cutter and bearing pin in which the number of such additional members is minimized and such additional members are secured to said bearing pin in nonrotatable relationship therewith (i.e., do not serve as antifriction bearings).

A subsidiary object is to provide such a structure for mounting, on a bearing member having a free end and side surfaces, a journal member relatively rotatable with such bearing member and surrounding its free end and side surfaces and wherein interfitting means are provided to secure such members together without appreciable relative movement other than rotation.

Ancillary objects are to provide simplified manufacturing processes for making such structures and to provide operable structures requiring a minimum of fabricating operations.

The above and further objects are achieved in the present invention by providing a bearing pin or shaft initially having a surface in the form of a complete figure of revolution and including a laterally projecting portion or lip of greater diameter than the portion of the shaft axially therebehind, and a cutter with an internal contour exactly matching the shaft surface except for the small increments in diameter for lubricant volume, manufacturing tolerances, and the like. This bearing pin is then relieved, to the extent necessary for mounting the cutter, by machining downwardly from that portion of its surface opposite the pressure side of the shaft, i.e., the "non-pressure" side. The pressure side of the shaft is that part nearest the bottom and sidewall of the formation borehole, as indicated by a vertical plane through the axis of the bearing pin, and the non-pressure side is its diametrically opposite counterpart. The pressure side of any shaft is the portion designed or adapted for maximum load transmission.

The rolling cutter is then assembled to the bearing pin, by a combination of linear, sliding and cocking movements, or, in some cases, a succession of linear or sliding movements. A portion of the cutter is thus positioned behind the aforementioned lip or flange of the bearing pin, and it is this lip which prevents the cutter from being withdrawn by axial movement only. Withdrawal can be accomplished only by reversing the assembly procedure, including any cocking movement. Such disassembly is prevented by inserting a plug into a bore extending from the outside of the bit leg completely through the bearing pin, or at least by a plug member secured in a bore or other recess in the bearing pin and having an end projecting outwardly into a space between the bearing pin and the cutter. This plug projects from the bearing pin into a gap or recess in a part of the inside surface of the cutter which would have to be cocked or otherwise moved in disassembly in such manner as to make such cocking or other movement impossible, thereby locking the two members together. The plug is secured in this position by any convenient means, e.g., welding it to the bit head at the entrance end of the bore.

Figure 2:
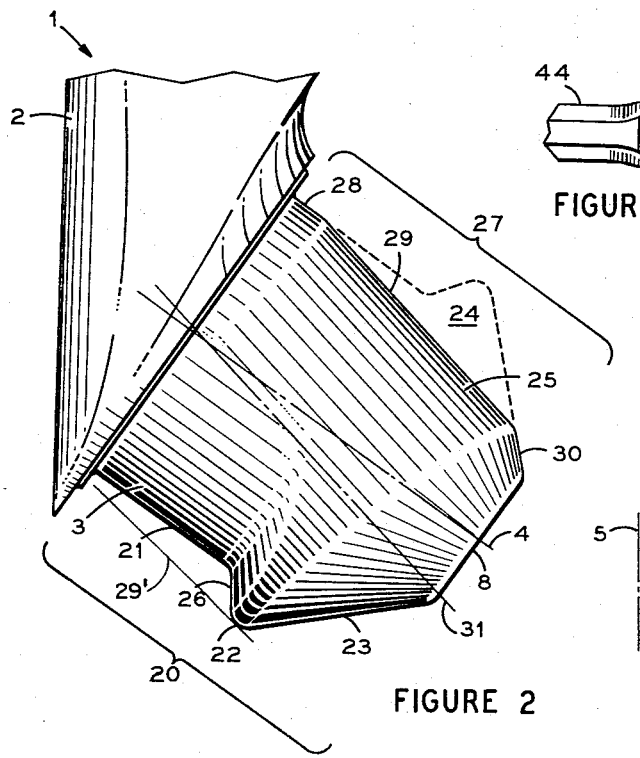
Figure 3:
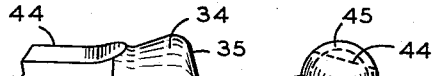
Figure 4:
Figure 8:
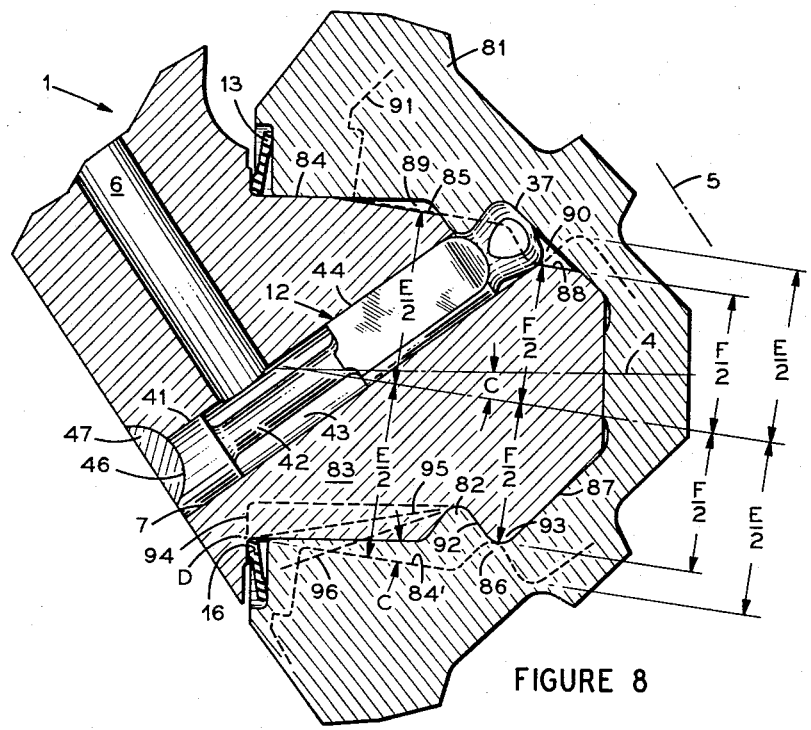
Figure 9:
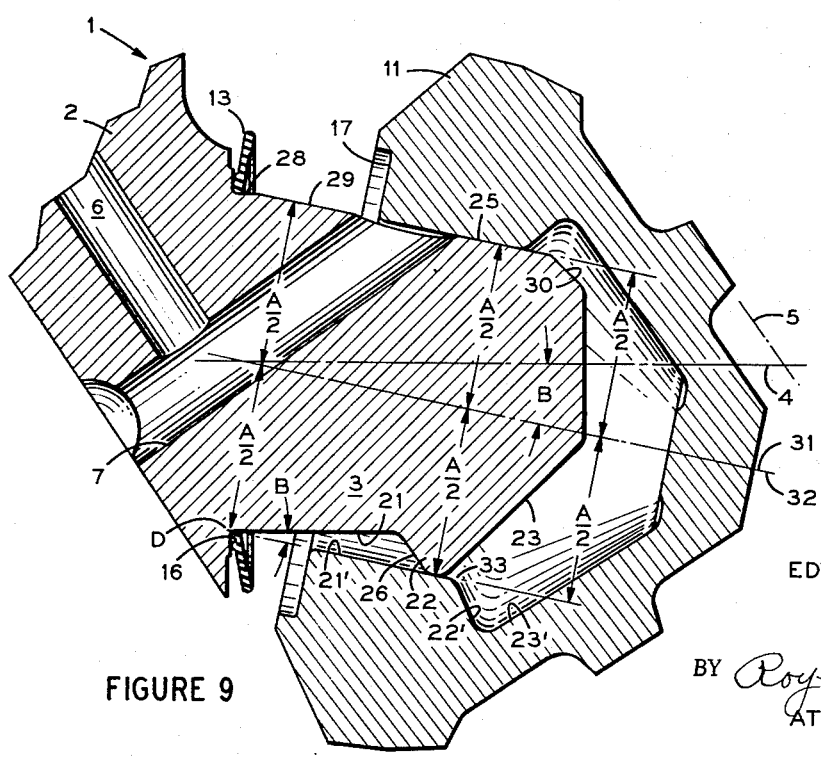
Figure 10:
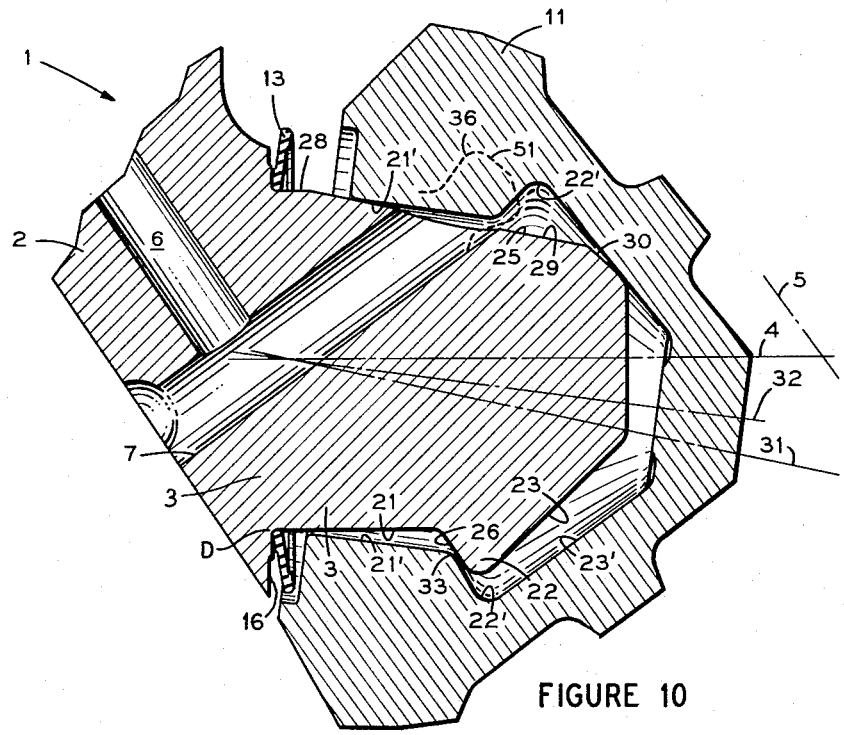
Figure 11:
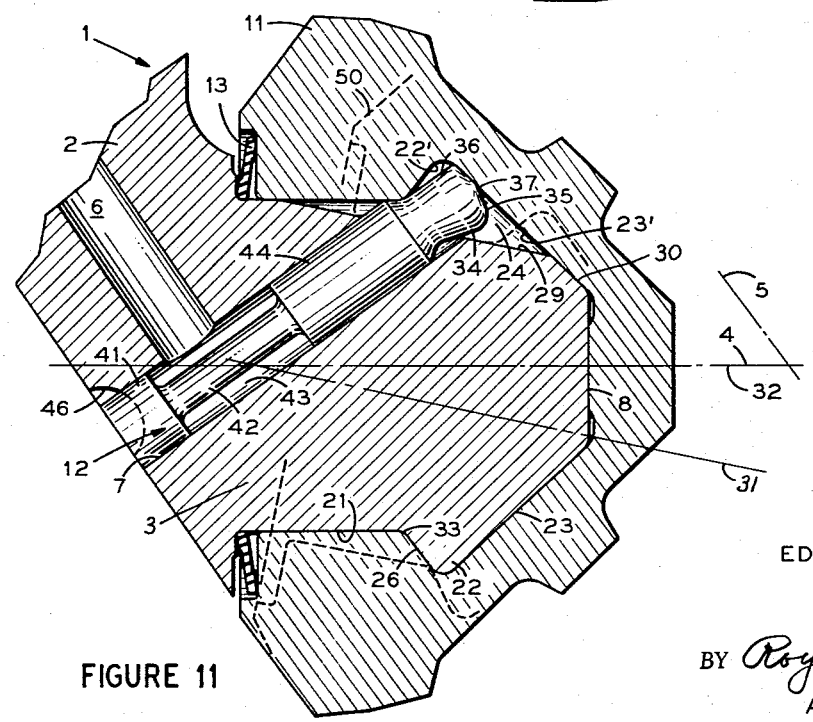
Figure 13:
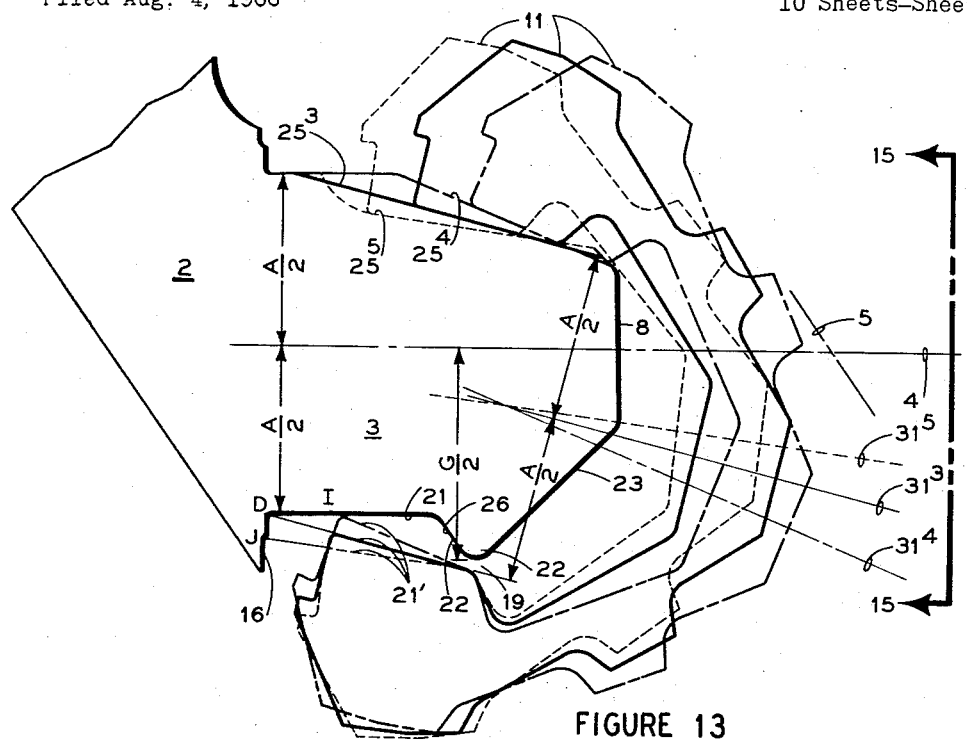
Figure 12:
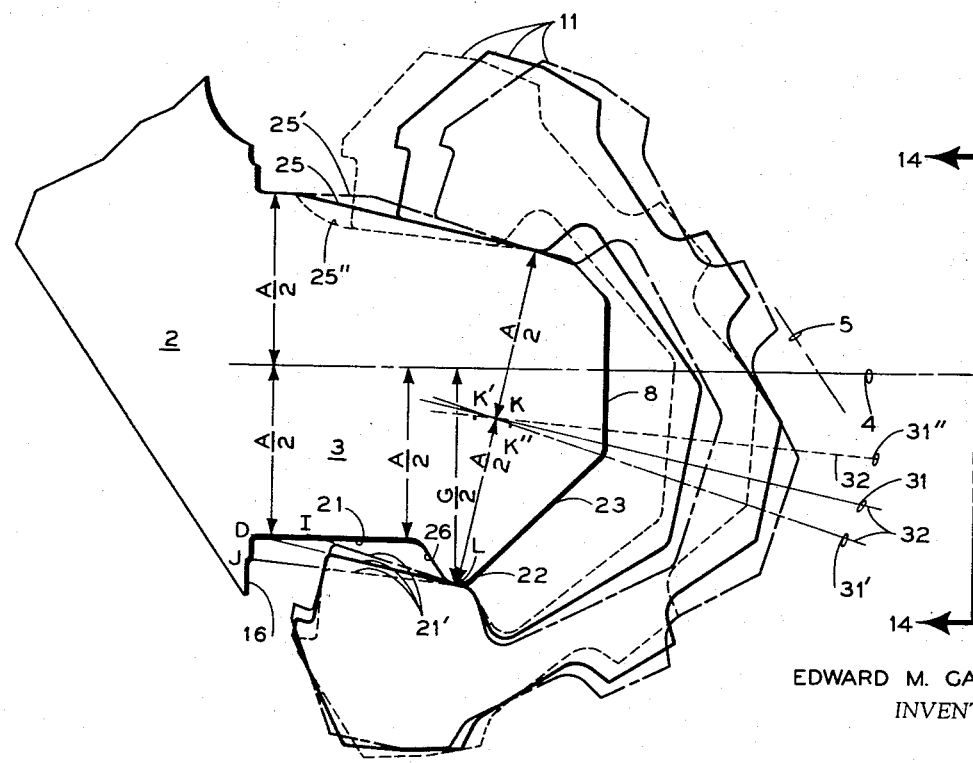

A variety of such bores and plugs may be used, and many variations of mating shaft and cutter contours as well. The scope of the present invention may be better appreciated by referring to the accompanying drawing, in which some of these variations are illustrated by way of example. In such drawing:

FIGURE 1 illustrates a preferred embodiment of the present invention, showing in vertical section a rolling cutter assembled on a bearing pin, complete with plug secured in place, FIGURE 2 is a side elevation of the bearing pin of FIGURE 1 with cutter and plug removed, FIGURES 3 and 4 are respectively top and end views of the plug of FIGURE 1, FIGURE 5 is an alternate embodiment, similar to that of FIGURE 1 except that the plug is disposed axially to furnish a pilot pin and the interior of the cutter is contoured to accommodate a prior art nose bushing and thrust button, FIGURE 6 is an embodiment similar to that shown in FIGURE 5 except for a different plug arrangement, FIGURE 7 is a partial section on lines 7—7 of FIGURE 6, illustrating a detail of the plug arrangement, FIGURE 8 shows another embodiment, differing from those in the other figures in that the shaft or bearing pin is formed with a groove to engage an annular ridge on the interior of the cutter, rather than the reverse, FIGURE 9 illustrates the first step in mounting the cone of FIGURE 1 on the shaft shown therein, this view also serving to illustrate one method of relieving the bearing pin, FIGURE 10 illustrates the second step in such mounting, FIGURE 11 shows the cone in final position with the plug being inserted to lock the cone on the shaft, FIGURE 12 is a vertical section like that of FIGURE 9 showing optional reliefs of the same bearing pin, most of the locking plug and lubricant passage detail being omitted in the interest of simplicity and cross hatching being omitted to avoid confusion between the optional shaft reliefs for the cutter dispositions shown, FIGURE 12A illustrates an embodiment similar to that of FIGURE 12 but differing therefrom in that the relieved surface of the shaft is formed to permit assembly of the rotating member thereto by linear or sliding movements only, FIGURE 13 is a vertical section showing additional optional reliefs of the bearing pin of FIGURES 9 and 12, such bearing pin differing from that of FIGURE 12 in that the relief is deeper and a gap is defined between the lip of the pin and the cutter for each of the cutter attitudes illustrated.

Figures 12, 23:
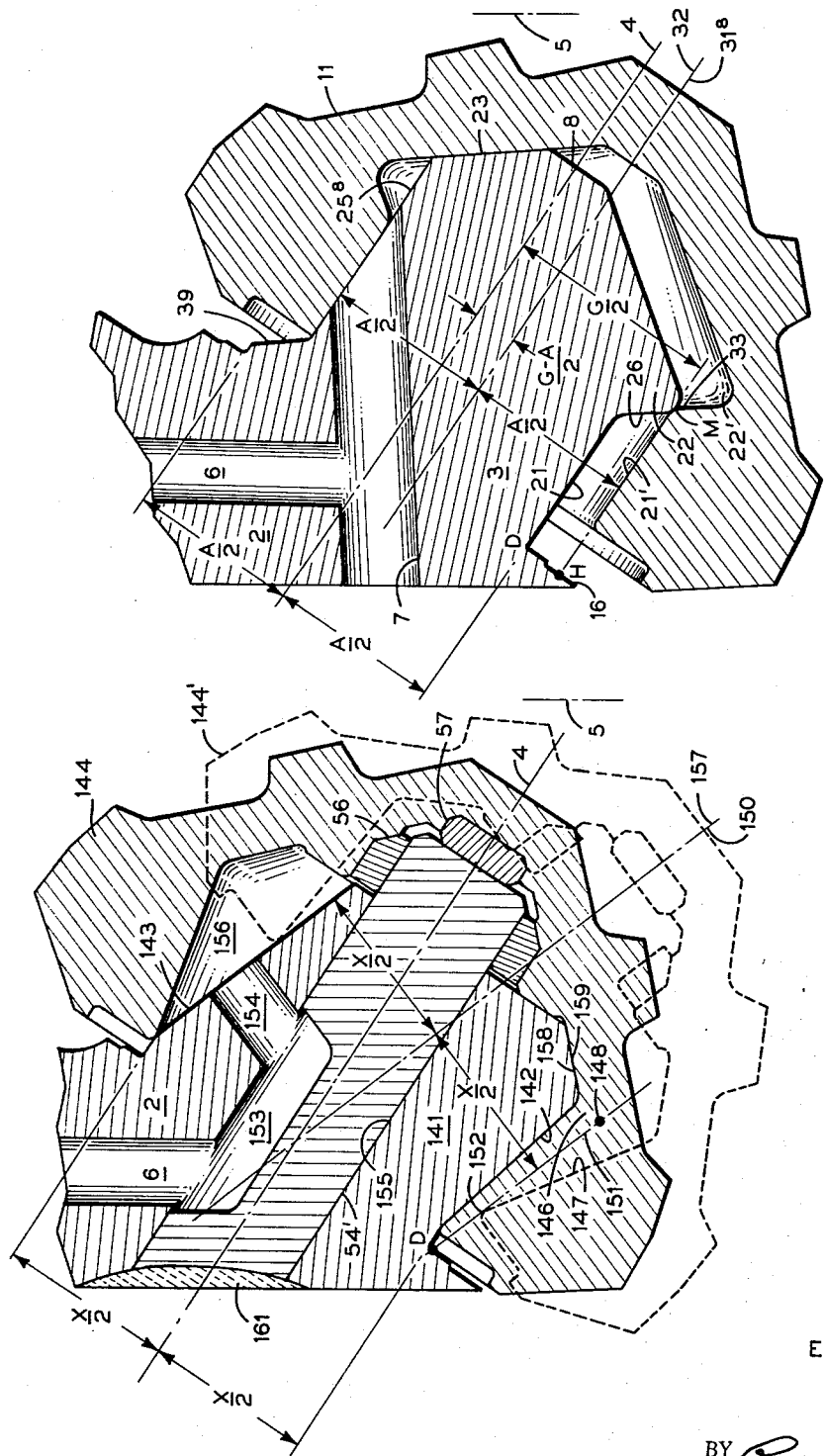
Figure 15:
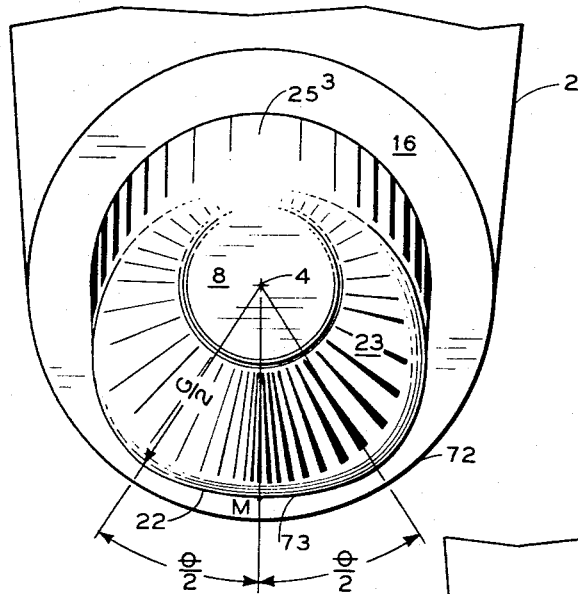
Figure 14:
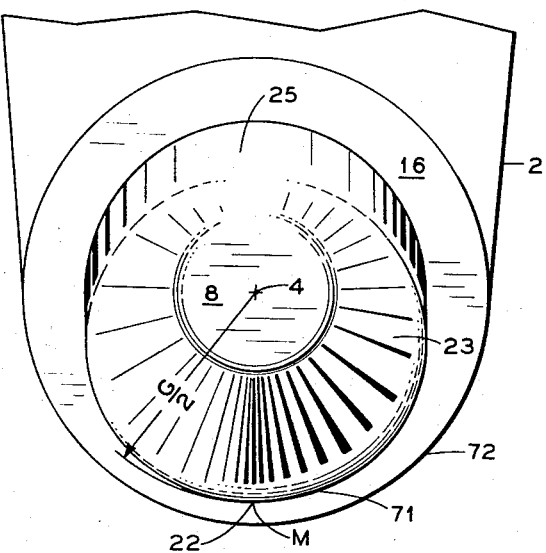
Figure 16:
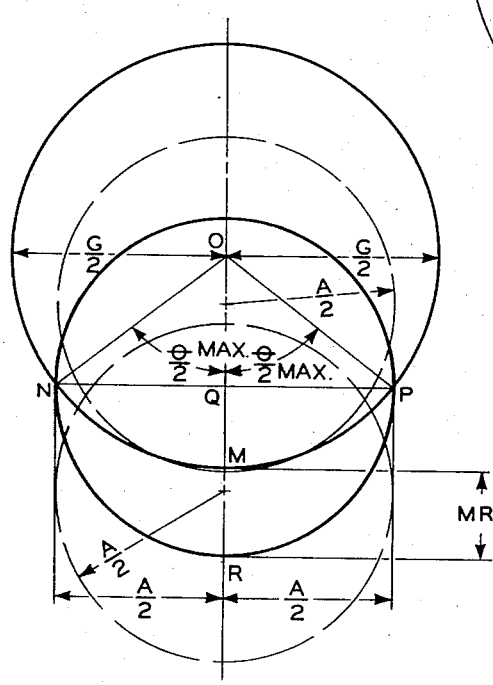
Figure 17:
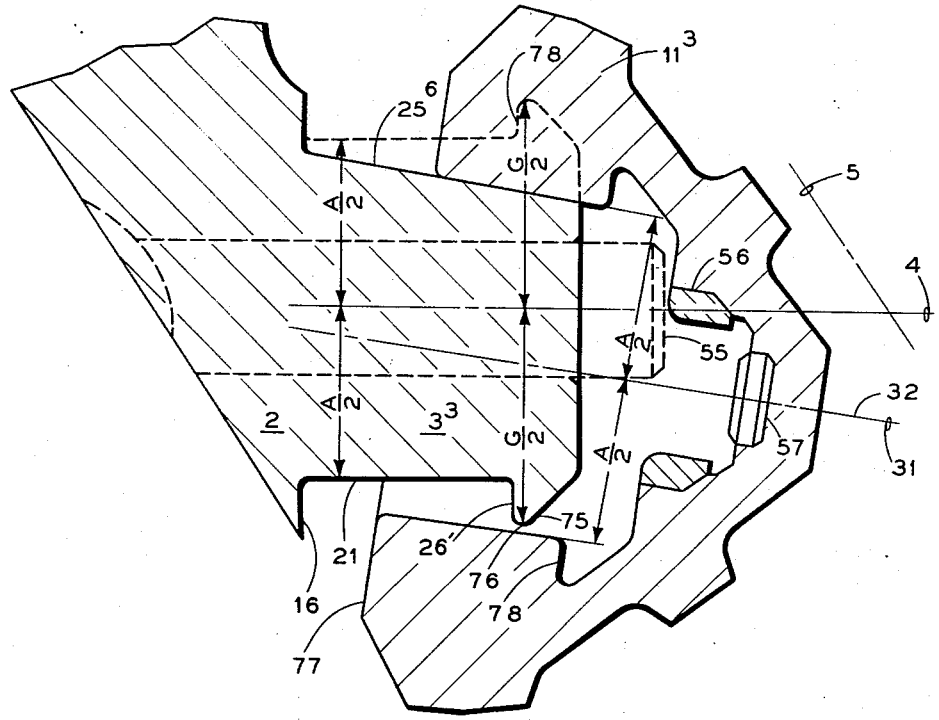
Figure 18:
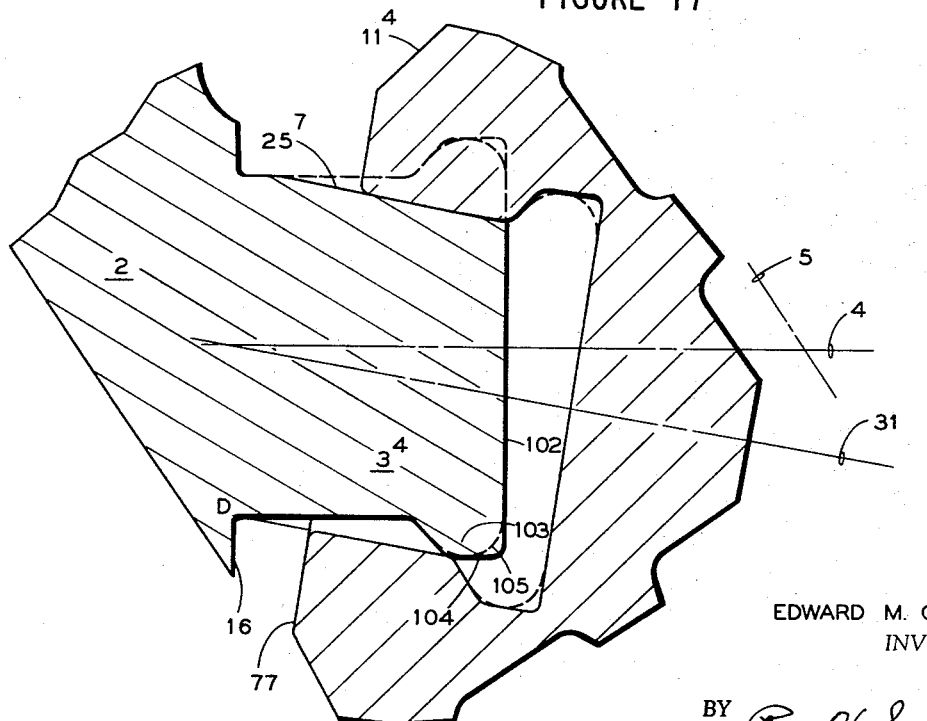
Figure 19:
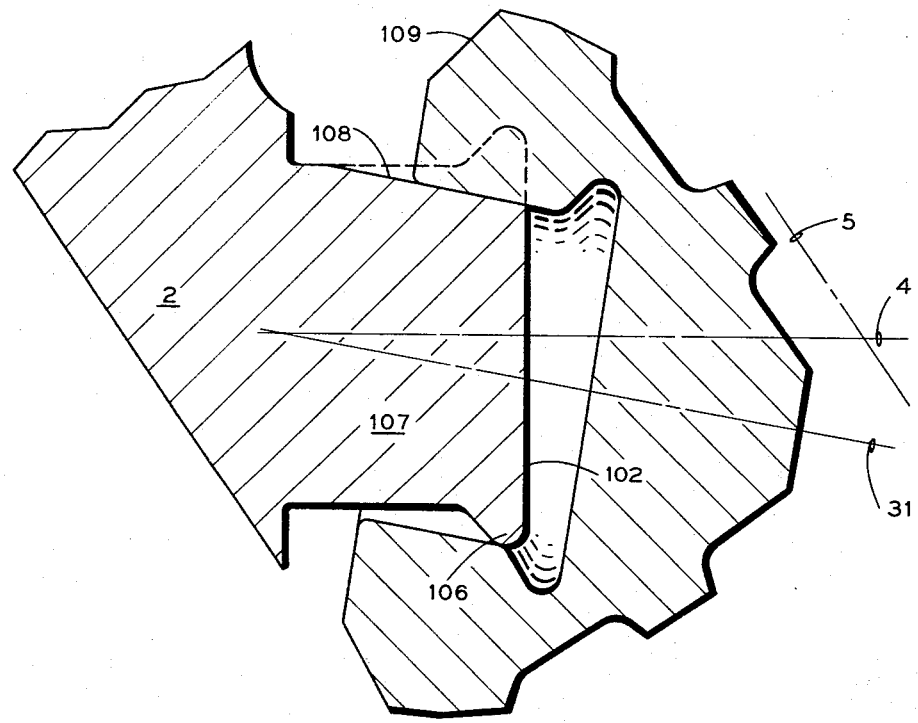
Figure 20:
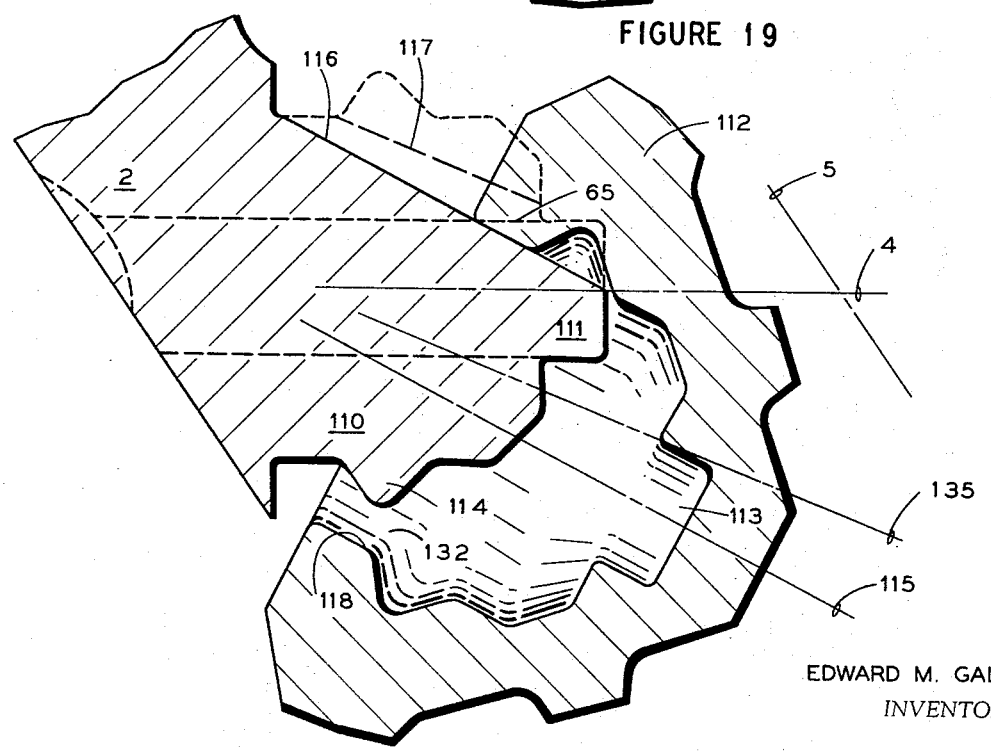
Figure 21:
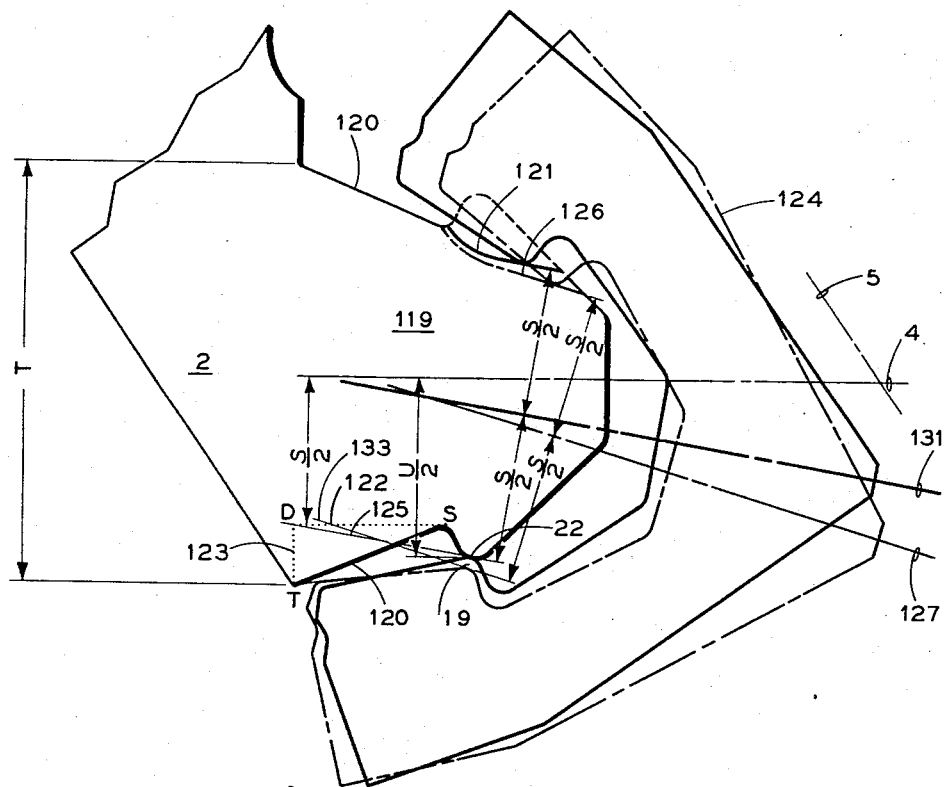
Figure 22:
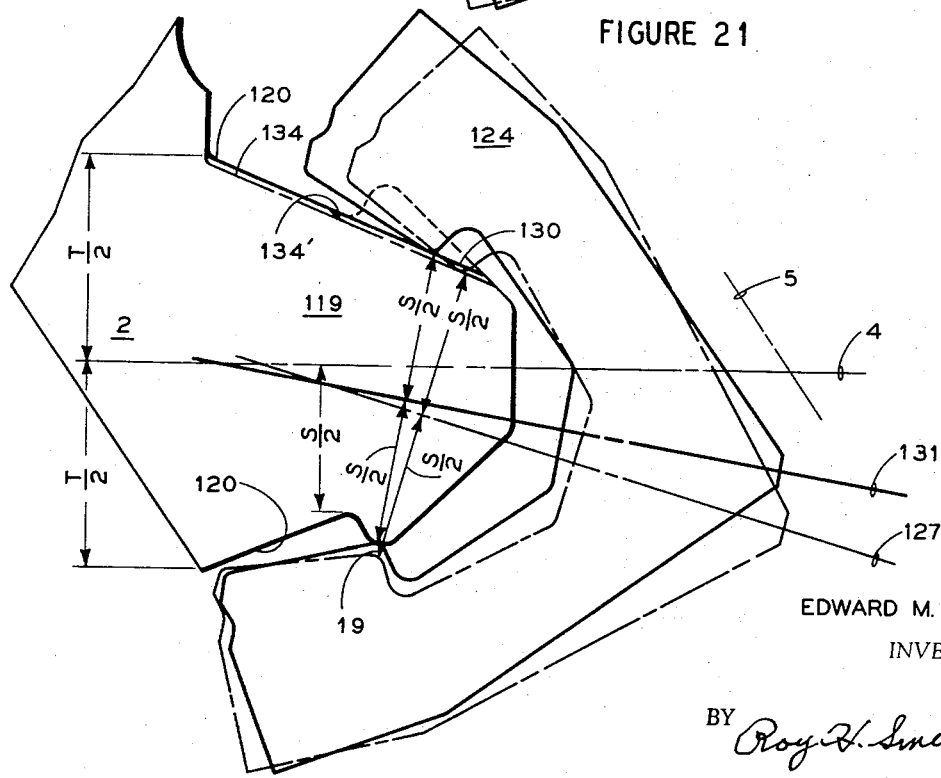

FIGURE 14 is an end view of the bearing pin of FIGURE 12 shown therein in full outline (the same bearing pin contour as in FIGURES 1–2, 5–6, and 9–11), looking along the axis of the shaft as indicated by the arrows of FIGURE 12 marked 14—14, FIGURE 15 is a similar contrasting end view of the bearing pin of FIGURE 13 as indicated by arrows 15—15 thereof, FIGURE 16 is a schematic showing how to determine the maximum possible portion of the unrelieved portion of the bearing pin lip for a given radius of lip and given radius of the cylindrical base of a bearing pin, FIGURE 17 is a vertical section of a bearing pin in which the holding surface of the lip extends radially toward the pin axis, and also differing from the embodiment of FIGURES 1–7 and 9–15 in providing a modified relieved surface on the non-pressure side, this particular form of the invention requiring no remnant of the original contour at the non-pressure side, FIGURE 18 depicts in vertical section another form of the invention, one in which the part of the bearing pin forwardly of the lip (i.e., the portion between the lip and the unsupported end) is right cylindrical rather than inwardly tapering, FIGURE 19 is similar to FIGURE 18 in having no inwardly tapering pilot end but differing therefrom in having no cylindrical end either, i.e., the lip occurs at the free end of the pin, FIGURE 20 shows a form of the invention in which the lip lies closer to the supported end of the bearing pin than those previously listed, FIGURE 21 illustrates an embodiment of the invention in which the unrelieved portion of the bearing pin lying between the supported end and the lip is frustoconical and tapers from a minimum diameter at its juncture with the lip to a maximum diameter at its juncture with the support which is larger than the outermost diameter of the lip itself, the relief of this embodiment defining a cylindrical surface symmetrical about a machining axis and the figure illustrating in phantom an optional relief in which more metal is sacrificed from the non-pressure side to leave a greater portion of untouched lip adjacent the pressure side, FIGURE 22 illustrates two more optional reliefs for the bearing pin of FIGURE 21, the relieved surface in each case also being a conical surface, and FIGURE 23 depicts an embodiment in which the holding surface at the back side of the lip of the shaft is so exaggerated in length as to eliminate the base surface constituting a distinct surface in other embodiments.

In all of the assembly figures of the above, no attempt has been made to indicate the lubricant volume or clearance between cutter and bearing pin. This is done in the interest of simplicity, as this space is quite small relative to the size of the cutter and shaft. It should be kept in mind, however, that such space is provided, e.g., 3 to 5 mils of radial gap 14 per inch of bearing pin diameter and 5 mils for axial gap 15. Also, it should be noted that in many of the figures the bit leg is shown cocked with respect to the edges of the paper to minimize the number of sheets of drawing. To obtain the proper orientation with respect to a vertical borehole it should be kept in mind that bit axis 5, which is also the axis of the borehole, is vertical, as is also true of the illustrated outer surface of bit leg 2.

FIGURE 1 shows a part of a typical rock bit 1 terminating downwardly in at least one bit leg 2 from which a shaft or bearing pin 3 extends downwardly and inwardly. Axis 4 of the bearing pin 3 may intersect bit axis 5, or may be slightly offset therefrom. The upper portion of the bit, not shown, terminates in a conventional hollow shank threaded for connection to the lower end of a drill collar or other drill stem member. Flushing fluid passageways not shown extend from the interior of such shank either centrally through the bit head or through the bit head to circumferentially disposed nozzles located between bit legs 2. A lubricant passageway 6 extends from a lubricant reservoir, not shown, which may be located in the bit head, to bore 7 extending through bit leg 2 and bearing pin 3. Suitable lubricant reservoir structures and pressure compensators are shown in the above identified patents of Atkinson et al. and Cunningham, and others are shown in the U.S. patents to Cunningham, 3,007,750 and to Eenink, 3,007,751.

The bearing assembly 10 of FIGURE 1 includes only bearing pin 3, rolling cutter 11 and plug 12, although of course a seal ring 13 is preferred to make such combination a fully effective lubricated and sealed bearing assembly. Any structure may be used for seal ring 13 which prevents the entry of drilling mud and other contaminants into the bearing gap 14 and limits the rate of lubricant loss therefrom to a reasonable value. As previously indicated, suitable such structures are disclosed in the above identified patents of Atkinson et al, and of Cunningham, and the pending applications of the present inventor. Briefly, each patented sealing structure consists of an annular seal ring comprising a metal ring or Belleville spring slightly dished in the axial direction and with a relaxed position such that its axial extent is greater than the axial dimension of a gap 18 between a pair of axially facing annular surfaces 16 and 17 on bit leg 2 and cutter 11. This spring has a rubber covering over those portions acting on the annular surfaces to promote sealing and sliding engagement, and such covering may extend from the inside diameter of the spring or core to effect a range of engagements with the cylindrical surface of bearing pin 3 ranging from a free floating fit to an interference fit in which the seal ring rotates extremely slowly around the bearing pin. The seal ring 13 is partially flattened in initial assembly and seals against a wide combination of movements of cutter 11 with respect to bearing pin 3—axial in both directions, radial and wobbling. The seal ring is designed to accommodate the rapid fluctuations in lubricant pressure relative to drilling fluid pressure consequent upon such movements of cutter 11 and the resulting variations in the volume of bearing gaps 14, 15 and 18, both total and local. It is also designed to permit very slow leakage of lubricant between surface 17 and the portion of the seal ring 13 contacting such surface to keep such surface adequately lubricated.

As best seen in FIGURE 2, the surface of bearing pin 3 in its original condition comprises a cylindrical portion 21, a lip or ridge 22 and a tapered or conical pilot portion 23, all of which may be thought of as surfaces defined by rotating the contour or axial element 20 at the pressure side about axis 4. In the language of solid geometry, axial element 20 is described as a "generatrix" and the resulting surface a "surface of revolution." Element 20 is also the "trace" of the line elements 21, 22 and 23 in the plane passing through the axis of the bearing pin and the center of the pressure side of the pin (which is also the plane of the paper), i.e., the trace is the intersection with that plane of a surface formed by rotating contour 20 about the same axis. A surface of revolution, of course, is a surface formed by rotating a line or curve about a fixed straight line, the revolving line generally being referred to as the generating line, generator or generatrix, and the fixed line being called the axis of revolution, axis of generation or axis of symmetry. Such a surface of revolution is said to be symmetrical in or symmetrical about the axis of revolution because in any position of the generatrix any given point lying on it is located at the same radial distance from the axis as the corresponding radial distances of the same point at all other positions of the generatrix, i.e., all sections through such surface normal to the axis of revolution are circles.

In its final condition, each such portion of the bearing pin surface is at least partially modified by a method to be described to define a gap 24 between the original surface and the modified surface 25. Gap 24 is largest at the center line of the non-pressure side of bearing pin 3, diametrically opposite the center of the pressure side thereof, as shown by modified contour 27 in FIGURE 2, and gradually decreases and disappears in proceeding circumferentially in either direction to the center of the pressure side. As indicated by contour 27, only a small portion 28 of original cylindrical surface 21 remains intact at the circumferential location where gap 24 is of maximum width, generally at or near the center of the non-pressure side of the bearing pin, and similarly only a small portion 30 of original conical surface 23. Between these portions 28 and 30 lies the modified contour 29 forming an element of surface 25. Altough surface 25 appears to taper in the manner of a conical surface between 28 and 30, and does taper or neck down from a maximum distance from shaft axis 4 to a minimum such distance between the supported and unsupported ends of the shaft, it is actually a cylindrical surface which may be thought of as formed by the rotation of element 29 about machining axis 31. Complete rotation of element 29 about axis 31 would produce the trace 29' at the center of the pressure side of the bearing pin, as shown in FIGURE 2.

To enable those skilled in the art to understand the making of the present invention in the form of a rock bit, FIGURE 9 of the drawing shows the first step in assembling the cutter 11 to the bearing pin 3 of the FIGURE 1 embodiment. As indicated in FIGURE 9, cutter 11 is slipped over the bearing pin 3 so that its cylindrical surface 21' contacts both contour 29 of the non-pressure side of the bearing pin and lip 22 on the pressure side of the pin. In this position it can be appreciated that the particular design is such that the projection of surface 21' at the pressure side will intersect the corner D formed by surfaces 16 and 21 of bit leg 2 and bearing pin 3. Since the line projecting surface 21' is tangent to lip 22, the angle B formed by its intersection with surface 21 can be readily determined from the known dimensions of the unmodified bearing pin. It then becomes apparent that the modified surface 29 must extend at the same angle B with respect to original surface 21, and that the machining axis 31 intersects pin axis 4 at angle B.

The only other design information required is the machining radius, which necessarily can be no larger than $A/2$, the radius of the cylindrical portion 21' of the interior of cutter 11. As indicated in FIGURE 9, machining axis 31 is disposed at the radius of $A/2$ from the point of tangency of cutter surface 21' to lip 22 on the pressure side of bit leg 3.

The two dimensions, angle B and machining radius $A/2$, determine uniquely the location of machining axis 31 lying in the same vertical plane as pin axis 4. By the use of well known geometrical propositions, the data can be transformed to dimensions more commonly used by machinists, e.g., the angle made by axis 31 with a horizontal and the normal distance from a reference point on bit leg 2 to such axis. The end result is the same, setting up bit leg 2 for rotation about axis 31, and thereafter machining bearing pin 3 to a radius of $A/2$ about axis 31, thereby defining surface 25 and gap 24. It will be apparent that element 29 is the generatrix of surface 25, that surface 25 is a partial surface of revolution symmetrical about machining axis 31, and that a full 360° extension of surface 25 has a trace in the vertical plane passing through axis 31 which coincides with the aforementioned element of surface 21' in that plane tangent to lip 22 and projecting toward the corner D. Such a trace is also indicated in FIGURE 2 by the reference character 29'. As there shown, this trace 29' lies at the center of the pressure side of the bearing pin, is tangent to lip 22 and parallel to machining axis 31, and extends toward the supported end of the shaft to intersect the juncture of the bearing pin and its support.

The cutter-mounting steps involved in proceeding from FIGURE 9 to FIGURE 10 are first a continuation of the sliding of cutter 11 with its axis 32 coincident with machining axis 31 and its cylindrical surface 21' sliding on modified surface 25 and lip 22 of the bearing pin. This motion (as shown in FIGURE 9) is continued until lower edge 33 of cylindrical surface 21' comes into contact with or slightly passes the extremity of lip 22, i.e., groove 22' of the cutter is in approximate axial registry with lip 22. Thereafter the motion is as shown in FIGURE 10, a combination of linear movement as before together with counterclockwise rotation or cocking about an imaginary horizontal axis normal to the sectioning plane passing through bearing pin 3 at about point D, or it may be thought of as a combination of such cocking and a movement of edge 33 down the back face 26 of lip 22. This combination movement is continued until the cutter is fully seated, as in FIGURE 1 or 11.

It will be noted from FIGURE 1 that the inner end 37 of locking plug 12 is contoured at 34 and 35 to conform to groove surface 22' and a portion of tapered surface 23' of cutter 11, and in assembled position such contoured surfaces 34 and 35 act as a bearing for 22 and 23', to the extent that any support is required, acting essentially in the place of the corresponding surfaces of the original bearing pin. As particularly shown in FIGURES 3 and 4, side surface 34 has a flat 36 machined thereon to make it possible for end 37 to be pushed under the lower edge 33 of cone 11. These figures together with FIGURE 1 also show that plug 12 has a solid rearward portion 41, a reduced section 42 underlying passage 6 and defining with bore 7 an annular gap 43, and a doubly beveled section 44 connecting section 42 with end 37 and defining with bore 7 passageways 45 for the flow of lubricant to the end of the bore. Outer end 41 of the plug is contoured at 46 to receive weld plug 47, as also the indicated portion of bit leg 2. It should be noted that an axial lubricant passage 9 may be used between gap 43 and free end 8 of the bearing pin, either alternately or in addition to the passage through bore 7.

FIGURE 11 indicates the penultimate step in assembly, differing from FIGURE 10 only in that the cutter has been fully seated and locking plug 12 has been pushed all the way through bore 7 and into gap 24 and groove 22′, and differing from FIGURE 1 only in that the plug has not been rotated to accomplish maximum contact between its surfaces 34 and 35 and surfaces 22′ and 23′ defining the groove of the cutter. This figure has been added, at the risk of prolixity, to emphasize two points. First, the assembly is essentially complete as shown in FIGURE 11 (save for adding weld 47), as it is not essential to maximize the bearing surface between the indicated members, nor indeed is it necessary to have any such contact at all. It should be kept in mind that the primary purpose of plug 12 is to prevent the cone 11 from slipping off bearing pin 3, and that the force exerted by either member on the other in the vicinity of plug end 37 is de minimis. The significant forces are those exerted by the formation on the cutter and in turn on the bearing pin at the pressure side of the latter, i.e., at the contour 20 as shown in FIGURE 2.

The second and somewhat interconnected point is that it is incorrect to say that the cutter can slip off when a portion of the plug as assembled in FIGURE 1 is abraded away under operating conditions to produce a second flat similar to 36 in the unrotated position of FIGURE 11, as many persons assume at first glance. To permit removal of cone 11 from bearing pin 3, it is necessary to shear or abrade away essentially the full volume of plug end 37 projecting into gap 24. This may be verified by referring to FIGURES 9 and 10 and the descriptions thereof above, and by the phantom partial cone outline 50 in FIGURE 11 showing the end point of the first assembly step described above. Also note that the bulk of plug end 37 must be removed before the cone could assume such phantom position 50, as shown by the phantom outline 51 of the plug end shown in FIGURE 10.

The above described manner of relieving the bearing pin 3 of the one embodiment thus far described is not the only possible method, but it is the most adaptable to ready explanation. Other techniques are available without departing from the scope of the present invention, techniques which offer as their chief advantage a saving in machining time and elimination of scrap. One such method is forging the bearing pin with essentially the final form shown on FIGURE 2, requiring only the usual finish machining.

FIGURE 5 illustrates an embodiment similar to the FIGURE 1 embodiment except that an axial cylindrical plug 54 is used to prevent the cocking of cutter 11′ necessary to disassembly. This plug 54 must necessarily project from bearing pin 3′ and engage a corresponding cylindrical surface of cutter 11′. In the drawing this is accomplished by having the projecting portion 55 of plug 54 serve the function of the pilot pin commonly used in many prior art bits, such pilot portion 55 engaging in rotatable relationship both the pilot pin bushing 56 and the thrust button 57. Both of these now conventional members are force fitted into the indicated appropriate recesses in cutter 11′ and rotate as integral parts of the cutter. They are customarily employed because it is easier to prepare them as tough, abrasion-resistant parts than it is to impart the same toughness and wear resistance to surfaces of the cutter making direct contact with the pilot pin, but the present invention also contemplates structures utilizing such direct contact, as in FIGURE 6.

The embodiment of FIGURE 5 may include in the complete assembly a seal ring 13 as previously described, and likewise a connection to a source of lubricant through a passageway 6′. Appropriate annular and axial passages in either or both bearing pin 3′ and plug 54 may be used to distribute such lubricant to the bearing gaps, or one may use the illustrated passage 58 directly linking passageway 6′ with gap 24′.

The assembly of cone 11′ to bearing pin 3′ is identical to that described above for the FIGURE 1 embodiment except for the plug, as relieved surface 29′ and gap 24′ are formed in the identical manner. Plug 54 is simply inserted to lock the assembly, and is secured in place, with no necessity for rotation, by weld 62. Of course, only the projecting portion 55 of plug 54 need necessarily be cylindrical.

It should be noted in passing that FIGURE 5 (and also FIGURE 6 below) illustrate the lack of necessity for a bearing surface at the nonpressure side of the bearing pin, i.e., where gap 24′ is largest. It can also be noted that the present invention is not limited to a bearing assembly in which the bearing pin tapers from the extremity of lip 22 to the end 8′ of such pin 3′. As indicated by the dashed outlines 59, 60 and 61, the bearing pin 3′ may alternately terminate at the extremity of lip 22 or may extend forwardly thereof by projecting such extremity parallel to axis 4 as at 61 and terminating it with a flat end 60 of maximum diameter. The same is true of earlier described embodiments, and it is to be understood that the inner contour and the thickness of the cutter are adjusted accordingly. All of this points up the minimum requirement of a projecting portion or lip on the bearing pin with a surface 26 extending generally inwardly from the radially outermost extremity thereof toward the pin axis to form a holding surface or shoulder for a matched surface on the cutter. In an earth penetrating tool, it is highly desirable that holding surface 26 be approximately vertical to resist thrust from the formation sidewall normal to the bit axis.

FIGURES 6 and 7 illustrate an embodiment similar to that of FIGURE 5 except that the large plug 54 of FIGURE 5 has been replaced with two members 65 and 66. Member 65 is a plug which projects beyond the end of bearing pin 3″ to serve both as a pilot pin and as an anticocking means. Member 66 is a pusher plug adapted to slide in coaxially aligned passages of the same cross section in bit leg 2, bearing pin 3″ and plug 65. Such passage in plug 65 is in the form of a blind groove so that the lower end of pusher rod 66 may engage the bottom wall of such groove and push plug 65 into a predetermined engagement with the cylindrical pilot pin recess 67 in the nose of cutter 11″, i.e., with appropriate radial and axial bearing gaps. It should be noted that the eccentric disposition of pusher plug 66 prevents any rotation of plug 65 which might otherwise take place, and that pusher plug 66 and its matching grooves may have any convenient cross-section. Similarly, the upper portion of plug 65 and the corresponding upper portion of recess 68 in the nose of bearing pin 3″ may have any convenient cross-section, as the only surface which must necessarily be cylindrical is that on the portion of plug 65 protruding as shown into recess 67 of the cutter. It will be apparent, of course, that if either or both pusher plug 66 and the upper part of plug 65 and their corresponding grooves are made with other than circular cross-sections, e.g., square or hexagonal, pusher plug 66 may be mounted concentrically with plug 65 without risking rotation of plug 65.

From the description already adduced, it should be evident that prior to the final assembly step plug 65 is retracted into recess 68 of bearing pin 3″, such recess being coaxial with pin axis 4. When the cutter has been placed in its final position, pusher plug 66 is used to push plug 65 into the final position shown in FIGURE 6, after which the outer end of pusher rod 66 is secured to bit leg 2 with weld metal 69. As with the FIGURE 5 embodiment, the bearing gaps are connected to a lubricant reservoir through a main passageway 6' and a passageway 58 linking 6' to gap 24.

From the above description of the FIGURE 6 embodiment, many suggestions to those skilled in the art will be manifest on ways and means to vary the structures heretofore described to replace more of the material removed in forming gap 24 than is replaced by the simple plug 12 of FIGURE 1. By utilizing the plug and pusher plug principle of FIGURE 6, it is possible to form an appropriate recess in the bearing pin of FIGURE 1 so that much of the relieved material may be replaced at one stroke.

FIGURE 8 illustrates an embodiment differing from those heretofore considered in that the lip and groove arrangement of the previously described embodiments is apparently reversed, the lip 82 in FIGURE 8 being on the inside of cutter 81 and the groove being part of the outside surface of bearing pin 83. Another departure is that no part of bearing pin 83 need be of greater diameter than that of its cylindrical portion 84 prior to machining the relieved mounting surfaces 85 and 88, although there is a correspondence to the FIGURES 1–7 embodiments in that inwardly extending lip 82 of cutter 81 is of minimum inside diameter as compared with the diameter of its groove portion 86 immediately therebelow.

Relieved surfaces 85 and 88 and corresponding gaps 89 and 90 are preferably formed in a manner analogous to that described above for FIGURES 1–7, but some differences should be noted. From the phantom starting position 91 of cone 81 superimposed on the vertical section of FIGURE 8, with lip 82 of the cutter tangent to the lip 93 between surfaces 87 and 92 of the bearing pin, it can be seen that the original cylindrical surface 84 of pin 83 must be relieved to a radius not greater than $E/2$ while the original tapered portion 87 must be relieved to the smaller radius $F/2$. These dimensions correspond to the radius of the cylindrical portion and the minimum radius of the inwardly projecting lip 82 of the cutter 81. The angle C is determined like the angle B of FIGURE 9.

The balance of the assembly operations are described in connection with FIGURES 9–11, including the insertion of plug 12.

Additional phantom outlines 94, 95 and 96 for the cylindrical portion 84 of bearing pin 83 have been indicated in FIGURE 8 to illustrate some additional points. Phantom outline 94 from the minimum I.D. of the groove of bearing pin 83 is parallel to its axis 4 and is intended to show the similarity of the FIGURE 8 embodiment to that of FIGURE 1 and to emphasize the point that the bearing pin must provide at its pressure side a lip or projecting part sloping inwardly from a maximum radius to a minimum radius to define a retaining surface 92 for the cone. Phantom outlines 95 and 96 are merely illustrative of the fact that upwardly of such retaining surface the bearing pin may have any convenient surface of revolution contour such as the upwardly diverging conical surfaces 95 and 96 indicated.

FIGURE 12 illustrates that the invention is not limited to a relieved surface 25 which makes it possible to dispose cutter 11 during its first sliding movement with its interior cylindrical surface 21' in contact with such relieved surface and also contacting lip 22 so that its projection intersects corner D at the juncture of leg surface 16 and pin surface 21, as shown in solid outline and also as shown in FIGURE 9. Alternately, relieved surfaces 25' or 25" may be provided by rotating the bearing pin about machining axes 31' or 31", respectively, the former being shown in alternating short and long dashes and requiring the removal of less material than for surface 25 while the double prime variety is shown by uniformly short dashes and requires the removal of more material. Relieving the bearing pin as indicated by surface 25' allows the cutter to be slid along such surface while contacting lip 22 at the pressure side so that cutter surface 21' intersects pin surface 21 at a point I removed from juncture D. Correspondingly, surface 25" permits a similar sliding thereon so that surface 21' projects onto surface 16 at a point J away from juncture D. In each instance, the machining axis is parallel to surface 21' of the cutter for the contact of the cutter with the particular relieved surface, and passes through a point K (or K' or K") which is $A/2$ from point L, the point of tangency of surfaces 21' to lip 22, measured normally from surface 21'. The dimension $A/2$ generally is the minimum radius of lip 22, occuring where holding surface 26 intersects the base surface, and, for the particular embodiment having a cylindrical base portion 21, $A/2$ is also the radius of such cylindrical base.

FIGURE 13 depicts optional and preferred methods of relieving bearing pin 3, in each of which the initial preassembly position of cutter 11 on the bearing pin is such that it contacts relieved surface $25^3$, $25^4$, or $25^5$ on the non-pressure side but defines a radial gap 19 with lip 22 at the pressure side of the shaft. As in the previously described embodiments, the alternate relieved surfaces permit mounting of the cutter so that its inner surface 21' projects to intersect one of pin surface 21, head surface 16 or their junction at D.

FIGURE 12A illustrates another variation in the relieved surface of the bearing pin, differing only slightly from relieved surface 25" of FIGURE 12. Whereas in FIGURE 12 the cutter 11 is preliminarily disposed so that its bearing surface 21' projects approximately but not quite parallel to shaft axis 4 and intersects surface 16 of the bit head 2 at a point J, in the FIGURE 12A embodiment bearing surface 21' is disposed parallel to axis 4 of the shaft and intersects surface 16 at a point H more remote from juncture D of the shaft and head than projection point J of the FIGURE 12 embodiment. The machining axis $31^8$ of the FIGURE 12A embodiment is also parallel to shaft axis 4, being offset therefrom toward about the center of the pressure side of the shaft. For the illustrated preliminary disposition of cutter 11 with its bearing surface 21' contacting relieved surface $25^3$ and tangent to lip 22 at about the center of the pressure side of the shaft, machining axis $31^8$ is offset from shaft axis 4 a distance of $$\frac{G}{2} - \frac{A}{2}$$

the difference between the maximum and minimum radii of lip 22. As in the other embodiments, relieved surface $25^3$ is formed to a radius of $A/2$ about machining axis $31^8$, this radius being the smallest radius of that part of the bearing surface 21' of the cutter lying between its groove 22' and its open end. Obviously, the FIGURE 12A form of the invention can be further varied by preliminarily disposing cutter 11 with a gap between its inner surface 21' and lip 22 of the shaft, as in the FIGURE 13 embodiment. Point H may also be more remote from juncture D than is indicated in the illustration, i.e., with machining axis $31^8$ intersecting shaft axis 4 at a point near the free end 8 of the shaft and with relieved surface $25^3$ sloping inwardly from a larger distance from axis 4 near the free end 8 to a smaller distance near the supported end, but there is little or nothing to be gained by such severe relief.

With the form of invention shown in FIGURE 12A, relieved surface $25^3$ cannot be described as tapering forwardly and inwardly with respect to shaft axis 4; the relationship is more properly described as one of parallelism, as any plane through axis 4 intersecting relieved surface $25^3$ intersects it in a line parallel to axis 4. It should also be noted that the mounting of cutter 11 on shaft 3 requires only linear sliding movements because cutter axis 32 is always parallel to shaft axis 4. The cutter is first slid onto relieved surface $25^3$, with cutter axis 32 coincident with machining axis $31^3$, until the lower or outer edge 33 of groove 22′ just passes line M at the outermost radius of lip 22, after which the cutter is moved at an angle with edge 33 sliding on the holding surface 26 of the lip and other parts of the cutter similarly contacting the tapered forward surface 23 of the shaft and tapered surface 39 joining relieved surface $25^3$ to the juncture of shaft and head on the non-pressure side of the shaft. As in other embodiments, the cutter is secured to the shaft by a locking plug extending through opening 7 and into the gap between the shaft and the cutter.

FIGURES 14 and 15 are views respectively of only those bearing pins 3 of FIGURES 12 and 13 which have been relieved to have the full line configurations 25 and $25^3$, the views being taken along pin axis 4 in each case, looking at small end 8. The advantage of providing a relieved surface like $25^3$, which permits cutter 11 to slide along such surface with a gap 19 between the interior of the cutter 11 and lip 22 rather than a contact of such surface and lip, as in FIGURE 12, will be apparent from a close scrutiny of these figures. In FIGURE 14 the outermost edge of lip 22 has been cut away at all points except point M, where it passes through the center of the pressure side of the pin, as may be seen by the increasing radial distance between contours 71 and 72 in proceeding circumferentially in either direction from point M. Contour 72 is a reference circle circumscribed about bearing pin axis 4 while contour 71 represents the intersection of relieved surface 25 and the unmodified original surface 23.

By contrast, FIGURE 15 indicates that lip 22 is completely untouched over an included angle $\theta$, as the radial distance between contour 72 and contour 73, which represents the outermost contour of lip 22, remains constant over this angle (or, expressed in other words, the outermost part 73 of lip 22 retains its maximum radius $G/2$ over such angle). The importance of not shaving off lip 22 in the environs of the pressure side lies in the fact that utilization of the assembly shown may take a direction wherein the major load is normal to bit axis 5, e.g. in a reaming operation with a rock bit. When this is done, it is important to retain as much of the holding surface 26 of the lip as possible because the inward load is transmitted through this surface. If more of it is removed than is necessary, as in the FIGURES 12 and 14 embodiment, the cutter would bear against the remaining part and wear it away more quickly than is possible with the FIGURES 13 and 15 embodiment. Once the holding surface 26 has been completely worn away, the cutter will be forced closer to the center of the hole and the effectiveness of the bit as a reamer will be diminished or destroyed because it can not cut to full gage. This result is avoided in the FIGURES 13 and 15 embodiment.

FIGURE 16 is a schematic or construction diagram which may be used to determine certain dimensions of a bearing pin relieved according to the present invention. The circle having the radius $G/2$ represents the outer contour of a bearing pin lip of the same maximum radius, and the circle of radius $A/2$ represents the inner contour of a cutter 11 whose major portion has the same radius, and thus the figure represents the position of a cutter and bearing pin when the former is being mounted over the lip of the latter in the offset cutter attitude described. The disposition of the two parts shown in full outline represents that in which $\theta$, the included angle of the untouched lip, is maximized. It is determined simply by erecting a chord NQP of length A in the larger circle, such chord being perpendicular to the line OM extending from center O, representing the pin axis, to a point M representing the center of the pressure side of the pin. The smaller circle is then circumscribed about chord NQP and the arc NMP of the larger circle lying within the circle defines angle $\theta$. The vertical distance MR between the circumferences of the circles approximately represents the radial dimension of gap 19, and the vertical distance OQ between the centers of the circles approximately represents the displacement of machining axis 31 from pin axis 4 in a cross-sectional plane through lip 22.

It should be noted that any other disposition of the smaller circle relative to the larger will result in a smaller value of $\theta$, as may be seen from the two dashed line circles of radius $A/2$ in FIGURE 16. For the diameters A equal to 2½ inches and G equal to 3⅛ inches used in the drawing, maximum $\theta$ was about 92° and gap dimension MR was about ⅝ inch. Somewhat smaller values for both $\theta$ and the gap spacing MR are preferred for actual use.

FIGURE 17 illustrates an embodiment having two modifications not present in any of the forms of the invention heretofore described, either of which modifications may be incorporated in the structure independently of the other. One of these modifications is in relieved surface $25^6$ of bearing pin $3^3$, which extends completely back to leg or support 2 at the non-pressure side of the pin and thus leaves no remnant of original surface 21, e.g., the portion 28 of the FIGURE 2 embodiment. While some such remnant is preferred, particularly when the invention is incorporated in a rock bit and such bit is used for reaming operations, or when the bit is to be lubricated and sealed, such remnant of the surface of revolution of the pin at the non-pressure side is not essential.

The other modification to the FIGURE 17 embodiment is in the holding surface of the bearing pin lip, i.e., the surface 26′ of the lip facing toward leg or support 2 and essential in engaging cutter $11^3$ to prevent axial movement of the cutter on shaft $3^3$. Whereas in all embodiment heretofore described this holding surface is a tapered or conical surface extending from the outermost tip of the lip inwardly toward pin axis and upwardly toward the supported end of the pin, in FIGURE 17 holding surface 26′ simply extends radially in from the tip 76 of lip 75 toward pin axis 4. The only disadvantage of such contour is that a slightly greater gap must be provided between surface 16 of head 2 and back face 77 of the cutter $11^3$, as finally assembled, to permit cocking movement of the cutter as it is being assembled on the pin. In this modification the internal bearing surface of cutter $11^3$ must, of course, be provided with a similar groove surface 78 extending radially inwardly to register with and engage the corresponding radial shoulder 26′ of the bearing pin. It will be apparent that the aforementioned larger gap between surface 16 of the head and back face 77 of the cutter may be reduced to the normal size of other embodiments by forming the relieved surface as discussed above for the FIGURE 12A embodiment, i.e., with machining axis 31 parallel to shaft axis 4 and spaced from extremity 76 of the lip (or the lower edge of a gap between 76 and the bearing surface of the cutter, if such a gap is provided) a distance $A/2$ corresponding to the minimum radius of the lip. As thus modified, the relieved surface would be parallel to shaft axis 4 and the cutter $11^3$ would be mounted by a first movement parallel to axis 4 and a second movement perpendicular to the same axis after aligning cutter groove surface 78 with holding surface 26′.

FIGURE 18 shows a modified embodiment in which the bearing pin $3^4$ has no inwardly tapering portion at its free end, but rather terminates in a broad flat end 102. The lip 103 of this embodiment shown in full outline extends for an appreciable distance as a cylindrical surface 104, rather than being more or less sharply ridged as in other embodiments. Alternately, this lip could have the arcuate contour 105 shown in phantom, which would eliminate the thin section of cone metal indicated. For either form relieved surface $25^7$ is determined by the method already described. The locking plug not shown may be either as shown in FIGURE 1 or as shown in FIGURE 5.

FIGURE 19 is similar to FIGURE 18 in providing a blunt end 102 on the bearing pin, and differs therefrom only in that lip 106 is more or less sharp and occurs at the free end of bearing pin 107. Relieved surface 108 is determined by the method already described, and cutter 109 is internally contoured to match the outline of the bearing pin on its pressure side. The locking plug not shown may be either as shown in FIGURE 1 or as shown in FIGURE 5.

FIGURE 20 depicts an embodiment in which lip 114 of bearing pin 110 occurs closer to support 2 than in the embodiments heretofore described. In the form shown in full outline, pilot pin portion 111 of the bearing pin is integral therewith and a matching recess 113 is provided in cutter 112. For this form the bearing pin must be rather severely relieved by rotating it about machining axis 115 while removing all material outside relieved surface 116; note for this form there is a large gap 132 between surface 118 of cutter 112 and lip 114 of the bearing pin. For such form the locking plug arrangement is not shown and would be as indicated in FIGURE 1.

An alternate form of the FIGURE 20 embodiment is indicated therein in phantom, and consists simply of replacing the integral pilot plug by a locking plug 65 of the type shown in FIGURE 5. For this form the bearing pin need not be relieved to any greater extent than required to define surface 117, the corresponding machining axis being shown at 135.

FIGURE 21 illustrates an embodiment in which the base surface 120 of the original bearing pin 119, between its supported end and the lip, tapers from a minimum diameter S at its juncture with the lip 22, which minimum diameter is less than the tip diameter U of the lip, to a maximum diameter T at its juncture with support 2. It should be noted that such maximum diameter T may be greater than the maximum diameter U of lip 22, as illustrated.

In this embodiment relieved surface 121 is a cylindrical surface symmetrical about machining axis 131, the latter being parallel to an imaginary line 225 which is tangent to lip 22 and approximately intersects the imaginary point D (all in the vertical plane containing bearing pin axis 4 and passing through approximately the centers of both the pressure and non-pressure sides of bearing pin 119, as heretofore). Point D is the intersection of a line 122, parallel to pin axis 4 and extending from the point S of minimum radius $S/2$ and a line 123, normal to line 122 and extending from point T of maximum radius $T/2$. The machining axis 131 is parallel to imaginary line 125 and is spaced normally therefrom a distance $S/2$ equal to the minimum radius of the pin base surface 120, measured from the extremity of lip 22 for the gapless form illustrated in solid lines. When a gap 19 is desired, the relieved surface 126 shown in phantom is defined by use of machining axis 127, the machining axis in this case being parallel to an imaginary line 133 approximately connecting the lower extremity of the gap to point D and spaced $S/2$ from such lower extremity. For either form it should be noted that relieved surface 121 or 126 removes only portions of the lip and forward part of the bearing pin and joins the tapered base with a gentle fillet, leaving practically all of the base portion intact. Cutter 124, as in other embodiments, has an internal bearing surface matching that of the bearing pin on its pressure side. A locking plug (not shown) similar to any of those previously described is added after the cutter is assembled with its axis coincident with shaft axis 4.

FIGURE 22 illustrates that the relieved surface 130 or 134 may in itself be tapered or slanted with respect to its machining axis rather than defining elements parallel thereto as in all embodiments previously described. Except for this distinction, the FIGURE 22 embodiment is the same as that of FIGURE 21, machining axes 131 and 127 being disposed as in FIGURE 21. Relieved surface 130 is spaced the minimum radius $S/2$ from machining axis 131 in a plane normal to such axis and passing through the extremity of lip 22, and tapers parallel to original surface 120 in the vertical cross section shown, the result being that most of the original surface is left intact. Similarly, the alternate relieved surface 134 shown in phantom, which makes possible a gap 19 on the pressure side, is spaced from machining axis 127 in the section normal to such axis and passing through lip 22 and the lower extremity of gap 19, and also tapers parallel to original surface 120 in the plane of the drawing, the result being a slight relief of all of the base surface at the non-pressure side. Such complete relief is not essential, and surface 134 may terminate with the fillet 134′ shown in phantom.

FIGURE 23 shows a form of the invention which apparently differs from all of the embodiments previously described in not including a lip and groove fit between its bearing pin and cutter. The difference is only apparent, however, as it is an equally valid view that the bearing pin 141 of FIGURE 23 is all lip, holding surface 142 having been enlarged so that it includes the base portion which is more or less distinct from the lip in other embodiments. The relieved surface 143 for the illustrated pre-assembly position of cutter 144, with a gap 146 between its interior bearing surface 147 and the pressure side of the bearing pin, is spaced from the lower extremity 148 of such gap a distance of X, the minimum diameter of bearing surface 147 (and the minimum diameter of bearing pin 141 at its supported end). Machining axis 150 is parallel to line 151, the path to be followed by the smallest diameter end 152 of the bearing surface 147 of the cutter and projecting from lowermost point 148 of the gap 146 to approximately intersect juncture D of the head 2 and bearing pin 141, and is spaced therefrom a distance equal to minimum radius $X/2$. Relieved surface 143 is, of course, formed by rotating the head and bearing pin about machining axis 150 and removing all material lying outside of minimum radius $X/2$. Gap 146 is essential in an embodiment like that of FIGURE 23 because of the fact that the shaft includes no base cylindrical portion. If no gap were used, the bearing surface on the pressure side would be reduced to a line 142 and the shaft would be incapable of serving as a bearing.

The pilot pin bushing 56 and thrust button 57 of the FIGURE 23 embodiment are the same as those shown in FIGURE 5. Plug 54′ is almost the same as the plug 54 of FIGURE 5, differing therefrom only in that plug 54′ has a lubricant groove 153 formed at one side, this groove communicating with passage 6 in the head and passage 154 in the bearing pin to complete a chain of interconnected lubricant passages extending from the lubricant reservoir (not shown) to the gap 156 defined by relieved surface 143 and the cutter in its assembled position.

The manner of assembling cutter 144 to bearing pin 141 is believed to be apparent, the cutter being slid on the bearing pin with its smallest diameter portion 152 approximately contacting relieved surface 143 at the non-pressure side and with the gap 146 between cutter bearing surface 147 and the surface of revolution 142 (or holding surface) of the bearing pin on the pressure side, as indicated by the preassembly position 144′ of the cutter shown in phantom. When the lower part of the back face of the cutter contacts or approximately contacts head 2, the cutter is simply rotated to bring its axis 157 into coincidence with the bearing pin axis 4 and seating cutter bearing surface 147 on holding surface 142 (and similarly seating the forward surface 158 of the cutter on the corresponding surface 159 of the bearing pin). Locking plug 54′ is then inserted in opening 155 until it extends from the free end of the bearing pin and into the cylindrical opening of bushing 56, with groove 153 properly aligned with passages 6 and 154, and weldment 161 is added in the usual manner to secure the plug to the head.

Nothing has been mentioned above about the cutting structure of the various cutters 11, 11', 11'', $11^3$, $11^4$, 81, 109, 112, 124 and 144 because they form no part of the present invention and may take any operable form. Similarly, there has been no mention of the characteristics of the various cutter and bearing pin surfaces defining journal and bearing, as suitable materials and treatments form no part of the present invention and many are known to those skilled in the art. It may also be mentioned that, while the various embodiments of the present invention have been described in part in terms of a partially relieved bearing pin having an original surface-of-revolution contour and are so delineated in at least some of the appended claims, it is apparent that scrap may be reduced in the manufacturing operation by forging rough bearing pins with some of such relief in the forging.

To summarize the invention, it may be recapitulated that the only parts involved are a cantilever or stub shaft, a rotary member to be mounted on the shaft in friction bearing relationship with it, and a locking plug extending out of the shaft and into a gap or opening surrounded by the rotary member. The outstanding inventive feature is the special shape of the shaft, and this involves both the configuration of the surface on its pressure side and the configuration of the surface on its non-pressure side. The surface on the pressure side must be a surface of revolution symmetric about the axis of the shaft in order to permit rotation of the rotary member, and of course the rotary member must have a substantially identical surface of revolution as its interior bearing surface. These surfaces of revolution must include at least one pair of registering holding surface portions, the holding surface on the shaft facing toward its supported end and extending from a maximum diameter to a minimum diameter. This holding surface is preferably the back face of an outwardly extending conical lip having its crest rounded off and its forward face extended forwardly to merge with the reduced section pilot portion or free end of the shaft, but it may have a wide variety of shapes and sizes. It is preferred that the holding surface be of relatively short length and join a longer base portion of the shaft which extends from the minimum diameter of the holding surface to the support, but the holding surface may be elongated and may even be extended to the support, thus eliminating any discrete base portion. The preferred slope of the holding surface is one in which its minimum diameter end is closer to the support than the maximum diameter end, but these portions may be equidistant from the support (holding surface perpendicular to the shaft axis) or the minimum diameter end may even be further from the support than the other end. In rock bit applications it is particularly desirable that the holding surface be vertical when the rock bit itself is vertical; this implies that, e.g., if the shaft is inclined at an angle of 54 degrees with a vertical bit axis the holding surface should also form an angle of 54 degrees with the shaft and its axis.

Except for the fact that it must include the holding surface, the surface of revolution on the pressure side of the shaft (and preferably approximately centered on such pressure side) is almost unlimited. While it is preferred that any base portion between holding surface and support be cylindrical in form, it may also be tapering from a smaller diameter where it joins the holding surface to a larger diameter at the support, and such larger diameter supported end can be made larger than the maximum diameter of the holding surface. (It can also be a combination of surfaces such as the short conical portion joining the holding surface of the FIGURE 8 embodiment and the longer cylindrical portion joining such short conical portion to the support.) With respect to the surface of revolution in the vicinity of the free end of the shaft, it has been pointed out that the preferred shaped is one tapering inwardly and toward a small flat termination, but again a wide variety of shapes can be used, and the entire shaft may even terminate at the maximum diameter of the holding surface with a large free end.

When it comes to describing the non-pressure side of the shaft, it is convenient to think of the shaft as originally having a complete surface of revolution on its outer surface, i.e., with the surface of revolution on its pressure side extended a full 360 degrees. The surface on the non-pressure side may then be described in terms of the minimum relief, or the minimum material that must be machined away in order to mount the rotary member on the shaft. Since even the minimum relief varies considerably with the manner in which the rotary member is disposed and moved in assembling it to the shaft, it is also convenient to describe the relief and the relieved surface by reference to the various pre-assembly positions of such member and the motions it follows in getting it from one position to the next. The major problem is passing the smaller diameter end of the holding surface of the rotary member over the larger diameter end of the holding surface of the shaft and any other parts of the shaft having a larger diameter than at its smaller diameter end. While this problem could be solved by rotating the shaft about its axis and machining all parts down to the size of the small diameter end of the holding surface, it is apparent that such a solution would be self-defeating. The holding surface would be completely eliminated, around the entire circumference of the shaft, and there would be nothing to keep the rotary member restrained from sliding off the shaft by an axial movement.

The solution according to the present invention is to bias the machining operation so that most of the material removed from the shaft is taken from the non-pressure side, where there is no load transmitted between shaft and rotary member, leaving as much as possible on the pressure side for load bearing purposes. To do this the shaft must be rotated around a machining axis lying between the shaft axis and the pressure side of the shaft.

To describe such machining axis and thus the relieved surface of the shaft, reference is made to a pre-assembly position of the rotary member in which the small diameter end of its holding surface surrounds the shaft to contact the relieved surface at the non-pressure side and to approximately contact the large diameter end of the shaft holding surface at about the center of the pressure side, preferably spaced therefrom by a small gap to insure that an appreciable part of the holding surface on the pressure side will be left intact. A machining axis is located in the reference plane (a plane passing through the shaft axis and about the center of the pressure side of the shaft, which plane also passes through about the center of the non-pressure side) by making it parallel to a reference line lying in the same plane. For the preferred embodiment this reference line is simply the reference plane trace of the base portion of the bearing surface of the rotary member in its pre-assembly position. This reference line passes through the outer edge of any gap, i.e., through the small diameter end of the holding surface of the rotary member in the described pre-assembly position, making it tangent to the maximum diameter end of the shaft holding surface when no gap is used, and extends generally toward the supported end of the shaft. It may be said to be approximately tangent to the maximum diameter end of the shaft holding surface and to pass through a point located approximately at the juncture of the shaft and its support, implying by the latter generality that the point may lie at the juncture or on either the shaft or the support in the general vicinity of their juncture (including the larger spacing of the FIGURE 12A embodiment). A more precise definition of the latter point which is general enough to include embodiments like those of FIGURES 8, 21 and 22 is to say that it lies at or near the intersection of a first line passing through the small diameter end of the shaft holding surface parallel to the shaft axis and a second line perpendicular to the shaft axis and passing through the juncture of the shaft and its support. For the preferred embodiment shown in FIGURES 1–7 and 9–16, this intersection is the same as the juncture of the shaft and its support, as is also true of the embodiments shown in FIGURES 17–20 and 23.

In addition to being parallel to the reference line, the machining axis is spaced normally from it a distance equal to the radius of the minimum diameter end of the holding surface. To form the relieved surface for the simple shape of the preferred embodiment, having a cylindrical base joining the small diameter end of the holding surface to the support, the shaft is simply rotated about the machining axis while machining it down to the radius of the small diameter end of the holding surface. For certain other embodiments this use of the reference line as a generatrix of the relieved surface is also adequate, but the result is that somewhat more than necessary material is removed from the non-pressure side of the shaft. To minimize the material removed from the FIGURE 8 embodiment, for instance, the generatrix is preferably thought of as having two parts: a first part extending rearwardly from the point of approximate contact of shaft and rotary member in the described pre-assembly position of the latter and consisting of the trace in the reference plane of the bearing surface of the rotary member lying between the small diameter end of its holding surface and its open end, and a second part extending forwardly from such point of approximate contact parallel to the machining axis. As illustrated in FIGURE 8, this two-part generatrix forms a two part relieved surface, a longer length part next to the support having the larger radius equal to that of the base of the shaft and a shorter length forward part having the smaller radius equal to that of the smaller end of the holding surface. The conical relieved surface of FIGURE 22 is produced by making the shaft have the diameter of the smaller end of the holding surface in a transverse plane passing through the point of approximate contact at the center of the pressure side and perpendicular to the machining axis, and thereafter machining the rest of the shaft, rearwardly and forwardly of such transverse plane, to have the same taper with respect to the shaft axis as the original surface of revolution (i.e., the two surfaces have parallel traces in the reference plane on the non-pressure side of the shaft, as shown in the drawing figure).

As previously indicated, these descriptions of the relieved surface have been devised in an attempt to indicate the minimum relief necessary for mounting the rotary member. Considerably more material may be removed from the non-pressure side of the shaft without affecting its capacity as a bearing, and it is to be understood that the relieved surface as defined in the appended claims may lie on or within the indicated minimum relief.

With respect to the locking plug, any of the described forms may be used, or any other plug extending into a gap between the rotary member and the shaft. This gap may be that formed at the non-pressure side of the shaft when material is removed to form the relieved surface, or it may be a gap or opening where the original shaft surface has been left intact and an opening is formed in the bearing surface of the rotary member. The illustrated forms are preferred, but of course the plug could be seated in and extend from a blind opening in the shaft having some means at the bottom of the opening to urge the plug outwardly into the gap, e.g., a spring, and such structure may be feasible.

What is claimed is:

1. In the combination of a rotatable member mounted on a stub shaft extending forwardly from an end secured to a support to a free end, said shaft having a base portion adjacent its supported end, an axis, a pressure side and a nonpressure side, the improvement whereby said rotatable member is journaled to said shaft without antifriction bearings, said improvement comprising a partial surface of revolution on said shaft extending in both circumferential directions from about the center of its pressure side and a relieved surface on the shaft extending in both circumferential directions from about the center of its non-pressure side and intersecting said surface of revolution, said surface of revolution including a radially projecting lip with a maximum diameter and a holding surface facing toward the supported end, said holding surface extending from such maximum diameter part of the lip to a minimum diameter juncture with the base portion of the shaft, said surface of revolution but for its lip being adapted to permit axial sliding of the rotatable member onto and from the shaft, said rotatable member having a blind opening in the form of a bearing surface matching the surface of revolution of the shaft, including a groove adapted to receive the lip of the shaft, an open end adapted to surround the shaft and its supported end, and a base portion lying between its groove and its open end, said relieved surface of the shaft tapering forwardly and inwardly toward the axis of the shaft to receive said rotatable member in a first pre-assembly position in which the axis of the rotatable member is inclined at an angle with the shaft axis and toward the center of said pressure side at the free end of the shaft and the smallest diameter part of the base portion of its bearing surface approximately contacts both said lip and said relieved surface, said shaft having a maximum dimension along a line normal to the axis of the rotatable member as thus disposed and extending from said relieved surface to said point of approximate contact of said rotatable member with said lip, measured in a plane passing through the axis of the shaft and about the center of its pressure side, equal to said minimum diameter of said base portion of the rotatable member, said shaft receiving said rotatable member in further pre-assembly positions in which the rearward portion of the bearing surface defining said groove is in increasingly closer position adjacent said holding surface of the shaft and said axis of the rotatable member is inclined at decreasingly smaller angles with the axis of the shaft, and a locking plug extending through a hole in the shaft and its support, said locking plug having an end extending from said shaft and surrounded by said rotatable member.

2. A journal bearing assembly comprising only three members, the first of which is a bearing pin supported at one end and having an axis, a pressure side, a non-pressure side, a partial surface of revolution on its pressure side symmetric about said axis and a relieved surface on its non-pressure side intersecting the surface of revolution, said surface of revolution including a lip portion of greater radius than the immediately adjacent portion in the direction of the supported end of the bearing pin, the second of said three members is a relatively rotatable member surrounding the free end of the bearing pin and said relieved surface and surface of revolution, said relatively rotatable member having an internal bearing surface in the form of a surface of revolution disposed in approximate contact with and matching said surface of revolution of the bearing pin and in co-alignment with the axis of said bearing pin, said surface of the relatively rotatable member including a groove receiving the lip portion of the corresponding bearing pin surface, a closed end registering with the unsupported end of said bearing pin and an open end approximately registering with the supported end thereof, and the third of said three members is a plug member extending through said bearing pin from its supported end and into an opening surrounded by said relatively rotatable member to prevent disassembly of said member from said bearing pin; said relieved surface of the bearing pin extending no farther radially from the axis of the shaft than an envelope surface of revolution having as its generatrix that portion of the axial cross section of the internal surface of the rotatable member lying between the groove and the open end thereof, said generatrix having a trace in the plane containing the bearing pin axis and the center of the pressure side of the bearing pin in which the smallest radius section of said portion approximately contacts said lip at about the center of the pressure side of the bearing pin and the balance of said portion is disposed to project approximately to the juncture of the shaft and its support, said envelope being formed by rotating said generatrix through said trace and about an axis of generation in said plane parallel to said projected portion of said trace of the generatrix and passing through a point spaced from said point of approximate contact of said trace and said lip, measured perpendicular to said projected portion, a distance equal to said smallest radius, said generatrix trace also extending toward the free end of the bearing pin parallel to said generating axis from the point where it approximately contacts said lip.

3. In a stub shaft mounted cantilever fashion with one end secured to a support and the opposed end free and unsupported, such shaft having an axis, a pressure side, a non-pressure side and a lateral bearing surface in the form of a partial surface of revolution on said pressure side symmetric about said axis, such shaft being adapted to receive a relatively rotatable member which surrounds said free end and said lateral surface and has a blind opening with an internal surface conforming to the free end and bearing surface of the shaft, the improvement comprising a lip on said bearing surface between the ends of said shaft, said lip being of greater diameter than the immediately adjacent portion of the bearing surface in the direction of said support, and a non-bearing relieved surface on the non-pressure side of said shaft, said relieved surface extending circumferentially in both directions to intersect said lateral bearing surface and extending axially in the direction toward said free end to lie within a surface tapering inwardly toward said shaft axis, said tapering surface accommodating the rotatable member on the shaft while in a slanted attitude with respect to the shaft axis and with the internal surface of the rotatable member in approximate contact with said relieved surface and allowing it to be slid on the shaft in such attitude until a groove in the internal surface of the rotatable member is in approximate registry with the lip of the shaft, and then permitting the member to be rotated into its assembled position in coaxial alignment with the shaft, said improvement also including an opening through said shaft from its supported end to receive a plug member extending through the opening and into a registering opening in the rotatable member to lock said member to the shaft.

4. In a rotary earth penetrating tool of the type having a head adapted to be secured to and depend from the lower end of a drill string in common rotary relationship therewith, said tool having at least one leg extending downwardly from the head and an integral bearing pin extending downwardly from said leg and inwardly toward the axis of rotation of the tool to define an unsupported end and having a conical rolling cutter mounted on such bearing pin, the bearing pin having an axis, a pressure side and a non-pressure side, the improvement comprising a journal bearing assembly of said cutter to said bearing pin in which said bearing pin has a partial surface of revolution about its axis and extending in both circumferential directions from about the center of its pressure side and a relieved surface extending in both circumferential directions from about the center of its non-pressure side, said relieved surface being tapered from a maximum radial distance from said bearing pin axis at a point adjacent the junction of said leg and bearing pin to a minimum radial distance from the bearbing pin axis at the unsupported end of the bearing pin to permit the mounting of said cutter by a combination of linear and cocking motions, said cutter having an internal surface of revolution about its own axis matching the surface of revolution of said bearing pin, said matching surfaces of revolution including a lip portion on said bearing pin and a corresponding groove on said cutter, said lip portion being of greater diameter than the adjacent portion of the pin in the direction of said bit leg whereby it prevents axial displacement of said cutter from its final assembly position of coaxial alignment with said bearing pin axis, and a plug member secured in a bore in said bearing pin and having an end projecting outwardly into a space between the bearing pin and the cutter to prevent its disassembly from the bearing pin.

5. In an earth penetrating tool of the type described in claim 4, a journal bearing assembly of the type therein claimed in which said lip defines a substantially vertical surface especially adapted to resist thrust exerted horizontally on said cutter by the sidewall of a formation to be drilled.

6. In an earth penetrating tool of the type described in claim 4, a journal bearing assembly of the type therein claimed in which said surface of revolution of said bearing pin includes a cylindrical base portion extending between said lip and the supported end of the bearing pin.

7. In an earth penetrating tool of the type described in claim 4, a journal bearing assembly as therein claimed in which said surface of revolution of the bearing pin includes a frusto-conical base portion extending between said lip and said leg, said base portion having a minimum diameter where it joins said lip and a maximum diameter where it joins said leg.

8. In an earth penetrating tool of the type described in claim 7, a journal bearing assembly as therein claimed in which said maximum diameter of the base portion is larger than the maximum diameter of said lip.

9. A journal bearing assembly comprising:
(A) bearing pin extending from a support and terminating in a free end, said bearing pin having a pressure side and a nonpressure side, and also having an axis,
 (A1) a partial surface of revolution having an axis which is the same as said bearing pin axis, said surface extending circumferentially in both directions from about the center of its pressure side
 (A2) and a relieved surface extending circumferentially in both directions from about the center of its nonpressure side and intersecting said surface of revolution,
 (A3) said surface of revolution including a lip portion of greater surface radius than the portion of the surface immediately adjacent in the axial direction of said support,
 (A4) said relieved surface being tapered forwardly with a maximum radial distance from the bearing pin axis at a point adjacent said support and a minimum radial distance from said axis at the free end of the bearing pin,
(B) a relatively rotatable member mounted on said bearing pin and surrounding the free end and said surfaces thereof,
 (B1) said rotatable member having an internal surface of revolution about its own axis matching the like surface of revolution of said bearing pin and in approximate contact therewith, including a groove receiving the lip portion of the bearing pin,
 (B2) said rotatable member as thus disposed defining a gap with said relieved surface;
 (A5) said relieved surface being thus tapered to define maximum cross sectional dimensions between the relieved surface and the surface of revolution such that the bearing pin accommodates the rotatable member in a cocked pre-assembly position wherein the axis of its internal surface is slanted away from the bearing pin axis toward the pressure side at the free end end of the bearing pin, wherein its internal surface is in approximate contact with said relieved surface and a portion of such surface rearwardly from and adjacent the groove therein is disposed adjacent said lip of the bearing pin at the pressure side of the bearing pin, (C) and a plug member secured in and extending through an opening in said bearing pin, (C1) said plug member having an end projecting from one of said surfaces of the bearing pin and surrounded by said rotatable member.

10. A journal bearing on a bearing pin extending from a support and terminating in a free end, said bearing pin having an axis, a pressure side and a nonpressure side, and also having between said support and said free end both a partial surface of revolution and a relieved surface, said surface of revolution having an axis coinciding with said bearing pin axis and extending circumferentially in both directions from about the center of its pressure side, said relieved surface extending circumferentially in both directions from about the center of at least a portion of its nonpressure side and intersecting said surface of revolution, said surface of revolution having a cylindrical base portion extending from said support and a lip portion joining the forward end of said base portion, said lip having a holding surface portion facing said base which extends from a minimum radius at its junction with the base to a maximum radius, said relieved surface being defined by rotating a generatrix about a machining axis lying in a plane passing through about the center line of said pressure side and the axis of the bearing pin, said generatrix being essentially a straight line passing through a position in said plane in which it passes adjacent said lip at its maximum diameter part at about the center of the pressure side and extends to approximately intersect the juncture of said bearing pin and its support, said machining axis being parallel to said generatrix position and spaced therefrom a radius equal to said minimum radius of the lip.

11. The journal bearing assembly of claim 10 in which the position of the generatrix of the relieved surface at about the center of the pressure side of the bearing pin is one in which it defines a gap with said lip at the maximum diameter of the lip.

12. The journal bearing assembly of claim 9 in which the projecting end of said plug extends into said gap.

13. The journal bearing assembly of claim 12 in which the projecting end of said plug extends through said gap into the groove of said rotatable member.

14. The journal bearing assembly of claim 9 in which said plug projects coaxially from said bearing pin at the free end thereof with a surface of revolution relatively rotatably contacting a like surface in a recess in said rotatable member.

15. The journal bearing assembly of claim 14 in which said plug is unitary and is extended through an opening in said bearing pin and support after assembling said rotatable member to said bearing pin.

16. The journal bearing assembly of claim 9 in which said partial surface of revolution comprises successive sections smoothly joined and proceeding axially from the supported end of said bearing pin of a right cylindrical section and a first conical section tapering outwardly from its joint with the end of said light cylindrical surface, said first conical section defining a rearwardly facing holding surface on said lip, and a second conical section facing forwardly on said lip and tapering inwardly toward the axis of revolution.

17. The journal bearing assembly of claim 16 in which said surface of revolution includes below said second conical section a terminal section extending radially inwardly to the axis of revolution.

18. The journal bearing assembly of claim 9 in which said surface of revolution includes a conical section tapering inwardly from a point adjacent the juncture of said bearing pin with its support to a point adjacent said lip portion.

19. The journal bearing assembly of claim 18 in which said surface of revolution also includes a second conical section below said lip tapering inwardly toward the axis of revolution and a terminal section extending radially inwardly.

20. A shaft to support a relatively rotatable member, said shaft having an axis, a pressure side and a non-pressure side, and also having a free end, a supported end and a journal in the form of a partial surface of revolution extending between said ends of the pressure side, said surface of revolution having an axis coincident with said shaft axis and having a base portion extending from said supported end and a lip joining said base portion, the lip having a holding surface facing toward the supported end of the shaft and extending from the maximum diameter extremity of the lip to a minimum diameter juncture with said base portion, said shaft having on its non-pressure side a boundary surface of lesser radius than said surface of revolution and lying no further from said shaft axis than a relieved surface tapering toward the free end of the shaft and inwardly toward its axis, said relieved surface having dimensions determined by an initial mounting position on the shaft of a relatively rotatable member having in its interior a bearing surface of substantially the same dimensions as said partial surface of revolution of the shaft, including a base portion and a groove to receive said lip of the shaft and meeting its base portion at a minimum diameter juncture, the attitude of the relatively rotatable member in such initial mounting position being that in which its axis is cocked away from said shaft axis toward the center of said pressure side of the shaft at the free end thereof, the base portion of its bearing surface contacts said relieved surface, and, at about the center of said pressure side, the juncture of its groove and base portion approximately contacts said lip and its base portion is disposed approximately to intersect the juncture of the shaft and its support, said relieved surface also permitting sliding and cocking movements of said relatively rotatable member from such initial position through a sequence of positions in which its groove is in increasingly closer radial registry with the lip to a final position in which said groove and lip are in complete registry and the axes of the shaft and rotatable member are co-aligned, said shaft also having an opening therein to receive a locking plug with an end projecting into a space between the shaft and the rotatable member to lock such member on the shaft.

21. A cantilever shaft secured to and extending from a support at one end and having its opposite end free and unsupported, said shaft having an axis, a lateral bearing surface, a pressure side and a non-pressure side and being adapted to support a rotary member in friction bearing relationship with the rotary member surrounding and substantially contacting the free end of the shaft and most of the lateral bearing surface thereof between said ends, said rotary member having an internal bearing surface and said pressure side of the shaft having a matching bearing surface in the form of a surface of revolution symmetric about said shaft axis and approximately centered on said pressure side and extending in both circumferential directions toward the non-pressure side, said surfaces of revolution including registering holding surfaces facing toward the supported end of the shaft and extending from a minimum diameter end to a maximum diameter end, said surface of revolution of the shaft being interrupted and foreshortened by a relieved surface approximately centered on the non-pressure side of the shaft and extending in both circumferential directions toward the pressure side, said relieved surface being symmetric about a machining axis lying in a reference plane approximately passing through the shaft axis and the centers of the pressure and non-pressure sides of the shaft and being parallel to a reference line in said reference plane which is approximately tangent to said maximum diameter end of the shaft holding surface and approximately passes through a point at the intersection of a first line in said plane which is parallel to the shaft axis and passes through the minimum diameter end of the shaft holding surface and a second line in said plane which is normal to the shaft axis and passes through the juncture of the shaft and its support, said machining axis being normally spaced from said reference line a distance substantially equal to the radius of said minimum diameter end of the holding surface and said relieved surface being formed at the same radius about said machining axis, said shaft also having an opening therein to accommodate a locking plug projecting outwardly into a gap between the shaft and said rotary member.

22. The cantilever shaft of claim 21 in which said holding surface portion of the surface of revolution is elongated to extend from said maximum diameter end spaced away from the supported end of the shaft to said minimum diameter end adjacent the juncture of the shaft and its support.

23. The cantilever shaft of claim 22 in which said surface of revolution includes a conical portion joining said maximum diameter end of the holding surface and tapering inwardly to a lesser diameter at the free end of the shaft.

24. The cantilever shaft of claim 21 in which said reference line and said machining axis are substantially parallel to said shaft axis, and thus lengthwise elements of said relieved surface defined by planes passing through said shaft axis are also parallel to such axis.

25. In the combination of a cantilever shaft secured at one end to a support and extending with a lateral bearing surface to a free end, a rotary member mounted on said shaft in friction bearing relationship therewith and a locking plug seated in a bore in said shaft and projecting therefrom into a gap surrounded by the rotary member, said shaft and rotary member in assembled position having co-aligned axes and said shaft having a pressure side and a non-pressure side, the improvement whereby said rotary member may be mounted on said shaft by moving it through a series of preassembly positions wherein the axis of the rotary member is displaced from the shaft axis toward the center of the pressure side of the shaft to a final position of co-aligned axes, said improvement comprising a partial surface of revolution on said shaft symmetric about said shaft axis and extending from about the center of its pressure side in both circumferential directions toward said non-pressure side and a relieved surface on the shaft symmetric about a machining axis and extending from about the center of the non-pressure side in both circumferential directions toward said pressure side, said surface of revolution including a cylindrical base, a first conical section joining said cylindrical base and tapering inwardly to terminate in a small diameter end, and a second conical portion joining said small diameter end and tapering outwardly to a larger diameter end, said second conical portion thus facing toward the supported end of the shaft and defining a holding surface to prevent axial displacement of the rotary member from the shaft, said rotary member having an internal bearing surface substantially identical with said surface of revolution of the shaft, said relieved surface being defined by rotating a generatrix about said machining axis which has a trace, in a reference plane passing through the shaft axis and about the center of the pressure side, defined by a preassembly position of said rotary member in which the smaller diameter end of its holding surface approximately contacts said larger diameter end of the holding surface of the shaft in said reference plane and in which its cylindrical portion is disposed in said plane to project approximately through the juncture of the shaft and its support, said generatrix trace including as a first part the contour in the reference plane of that portion of the bearing surface of the rotary member as thus disposed lying between the small diameter end of its holding surface and the rearward end of its cylindrical portion, and as a second part a line joining said small diameter end of the holding surface of the rotary member contour as thus disposed and extending forwardly toward the free end of the shaft parallel to said machining axis, said machining axis being parallel to said cylindrical portion of the first part of said trace and spaced normally therefrom a distance substantially equal to the radius of said cylindrical base portion, and thus also being parallel to said second part of the trace and spaced normally therefrom a distance equal to the small diameter end of said holding surface.

26. In the combination of a cantilever shaft secured at one end to a support and extending with a lateral bearing surface to a free end, a rotary member mounted on said shaft in friction bearing relationship therewith and a locking plug seated in a bore in said shaft and projecting therefrom into a gap surrounded by the rotary member, said shaft and rotary member in assembled position having co-aligned axes and said shaft having a pressure side and a non-pressure side, the improvement whereby said rotary member may be mounted on said shaft by moving it through a series of pre-assembly positions wherein the axis of the rotary member is displaced from the shaft axis toward the center of the pressure side of the shaft to a final position of co-aligned axes, said improvement comprising a partial surface of revolution on said shaft symmetric about said shaft axis and extending from about the center of its pressure side in both circumferential directions toward said non-pressure side and a relieved surface on the shaft symmetric about a machining axis and extending from about the center of the non-pressure side in both circumferential directions toward said pressure side, said partial surface of revolution including a conical base tapering inwardly from a major diameter end adjacent said support to a smaller diameter forward end, a conical holding surface joining the forward end of the base and tapering outwardly to a larger diameter forward end, and a conical terminal section joining the forward end of the holding surface and tapering inwardly to the free end of the shaft, said machining axis being normally spaced from a reference line a distance substantially equal to the radius of the smaller diameter end of said holding surface and lying in a reference plane, said reference plane passing through the shaft axis and approximately passing through the centers of the pressure and non-pressure sides of the shaft, said reference line lying in the reference plane and being approximately tangent to the larger diameter end of the shaft holding surface and approximately passing through the intersection of a first line in said plane which is parallel to the shaft axis and passes through the smaller diameter end of the shaft holding surface and a second line which is perpendicular to the shaft axis and passes through the juncture of the shaft and its support, said relieved surface being radially spaced from said machining axis, in a plane perpendicular thereto and passing through said maximum diameter end of the holding surface, a distance substantially equal to said radius of the minimum diameter end of the holding surface, said relieved surface also sloping forwardly from a maximum distance from the shaft axis at its end nearer said support to a minimum distance from said shaft axis at its end adjacent the free end of the shaft.

27. In the cantilever shaft bearing assembly of claim 26, the improvement thereto in which said relieved surface is a cylindrical surface defined by rotating the forward part of said reference line about said machining axis.

28. In the cantilever shaft bearing assembly of claim 26, the improvement therein in which said relieved surface is a conical surface tapering from a major diameter with respect to the machining axis at its end nearer said support to a minor diameter with respect to the machining axis at its end nearer the free end of the shaft.

29. In combination, a cantilever shaft extending from a support with a lateral bearing surface and terminating in a free end, a rotary member mounted in friction bearing relationship on said shaft and surrounding the free end and most of the lateral bearing surface thereof, and a locking plug seated in an opening in the shaft and protruding therefrom into a space surrounded by said rotary member, said shaft having an axis, a pressure side and a non-pressure side, said rotary member having a bearing surface which contacts said shaft in the form of a surface of revolution including a closed end, an open end and a lateral portion, said lateral portion including a holding surface facing toward said closed end and extending from a minimum diameter to a maximum diameter, said lateral bearing surface and free end of the shaft being divided into a surface of revolution symmetric about said axis and of essentially the same shape and size as the corresponding bearing surface of the rotary member, including a holding surface facing toward its supported end, and a relieved surface extending for at least a portion of the length of the shaft, said surface of revolution and relieved surface of the shaft being respectively approximately centered on the pressure and non-pressure sides of the shaft and each extending circumferentially in both directions from said center toward the center of the opposite side, said relieved surface lying at a smaller radius from the shaft axis than said surface of revolution by an amount enabling it to accommodate the rotary member in a succession of pre-assembly motions in the first of which the rotary member is slid on the shaft with its bearing surface approximately contacting said relieved surface and, at about the center of the pressure side of the shaft, the minimum diameter end of the holding surface of the rotary member approximately contacts the maximum diameter end of the holding surface of the shaft, and in further said motions the holding surface of the rotary member is brought into registry with the holding surface of the shaft and the axes of the surfaces of revolution of the two members are brought into coincidence.

30. The combination of a rotary member mounted in friction bearing relationship on a stub shaft fixed to and extending from a support with a lateral bearing surface and terminating in a free end, said rotary member having an internal bearing surface in the form of a surface of revolution symmetric about an axis, said surface of revolution confronting said lateral bearing surface and free end of the shaft, said shaft having an axis, a pressure side and a non-pressure side, the lateral bearing surface of the shaft having a partial surface of revolution symmetric about said shaft axis and substantially identical and registering with said surface of revolution of the rotary member extending in both circumferential directions from about the center of said pressure side and a relieved surface extending in both circumferential directions from about the center of said non-pressure side, said surface of revolution of the rotary member and partial surface of revolution of the shaft including holding surfaces extending from a minimum diameter to a maximum diameter, the holding surface of the shaft facing toward said support, said shaft and rotary member in assembled condition having the axes of their surfaces of revolution coincident, their holding surfaces registering and confronting one another whereby said rotary member is prevented from movement axially on said shaft, and having a gap between said relieved surface of the shaft and said surface of revolution of the rotary member, said combination including a plug member secured in and projecting from the shaft with its projecting end surrounded by the rotary member whereby said rotary member is prevented from movement to positions in which its axis is displaced relative to the shaft axis, said relieved surface of the shaft having cross-sectional dimensions permitting the mounting of said rotary member by moving it through a pre-assembly position in which its axis is displaced from the shaft axis toward about the center of the pressure side of the shaft and the cross section of its holding surface at the minimum diameter end thereof approximately contacts both said relieved surface and the large diameter end of the holding surface of the shaft.

References Cited

UNITED STATES PATENTS

| | | | |
|---|---|---|---|
| 1,852,478 | 4/1932 | Reed. | |
| 1,854,624 | 4/1932 | Powell. | |
| 1,867,531 | 7/1932 | Reed | 175—367 X |
| 1,884,965 | 10/1932 | Boggett | 308—8.2 |
| 1,909,078 | 5/1933 | Scott. | |
| 1,921,700 | 8/1933 | Reed. | |
| 1,921,701 | 8/1933 | Reed. | |
| 2,025,260 | 12/1935 | Zublin | 175—370 |
| 2,030,442 | 2/1936 | Scott. | |
| 2,620,686 | 12/1952 | Peter. | |
| 2,687,875 | 8/1954 | Morlan. | |
| 3,075,781 | 1/1963 | Atkinson. | |
| 3,137,508 | 6/1964 | Cunningham. | |
| 3,179,878 | 8/1965 | Atkinson. | |
| 3,235,316 | 2/1966 | Hanger. | |

FOREIGN PATENTS

| | | |
|---|---|---|
| 1,053,319 | 9/1954 | France. |
| 717,537 | 1/1942 | Germany. |

MARTIN P. SCHWADRON, *Primary Examiner.*

L. L. JOHNSON, *Assistant Examiner.*